United States Patent Office 3,338,891
Patented Aug. 29, 1967

3,338,891
B-NOR-6-METHYL STEROIDS
William J. Wechter, Kalamazoo, Mich., assignor to The Upjohn Company, Kalamazoo, Mich., a corporation of Delaware
No Drawing. Filed Feb. 13, 1963, Ser. No. 258,138
21 Claims. (Cl. 260—239.55)

This invention relates to certain novel B-nor-6($\alpha$ and $\beta$)-methyl steroids, more particularly to B-nor-6-methyl-17$\alpha$-hydroxy-4-pregnene-3,20-dione and its 21-hydroxy counterpart; the 11($\alpha$ and $\beta$)-hydroxy, 11-keto, 9$\alpha$-fluoro, 1-dehydro derivatives thereof substituted individually or in combination (where feasible) and corresponding otherwise thereto, and the 17- or 21-acylates of all of the foregoing compounds.

The novel compounds of this invention and processes for the preparation thereof are illustratively represented by the following sequence of formulae:

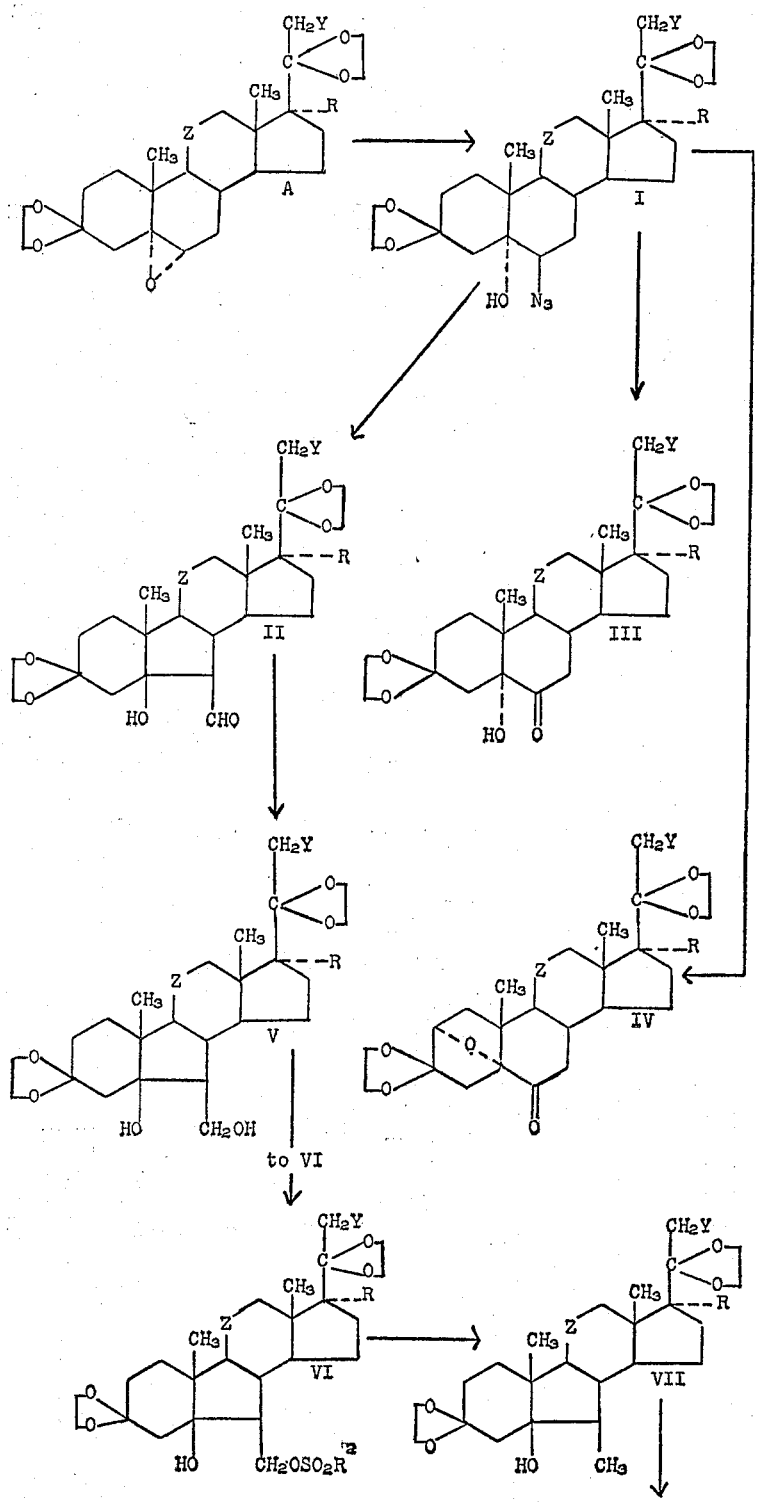

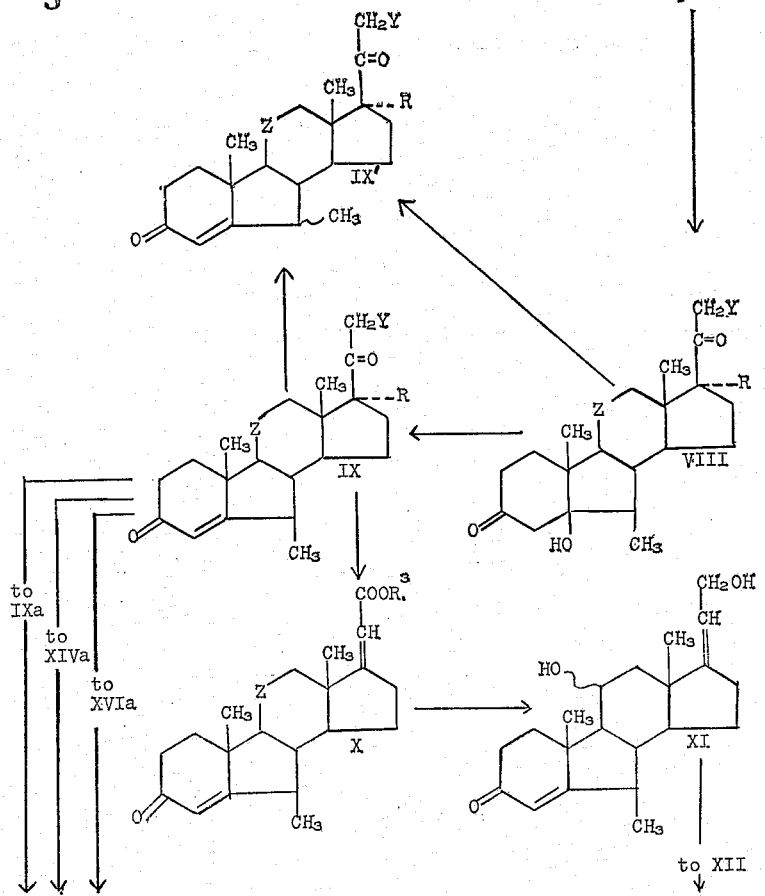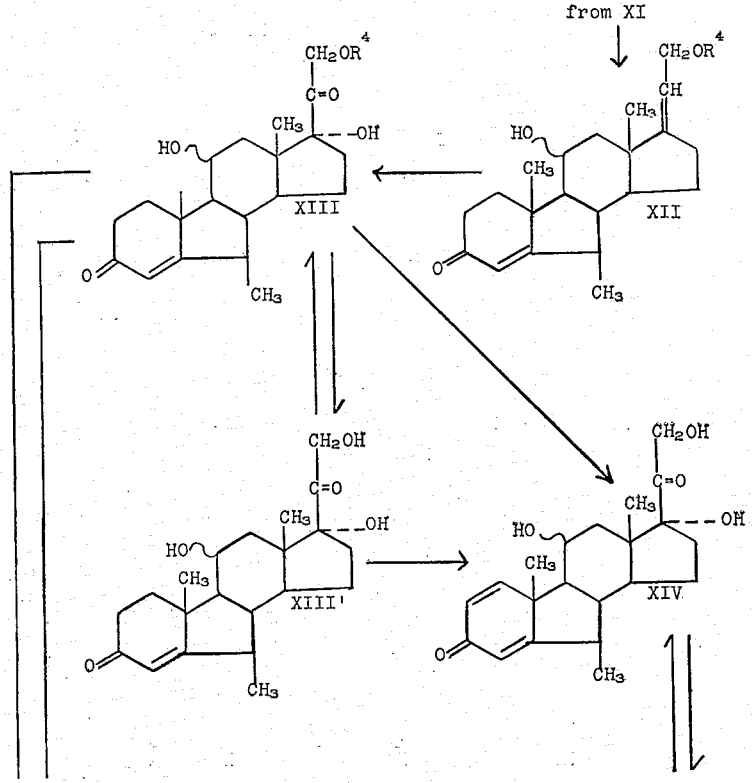

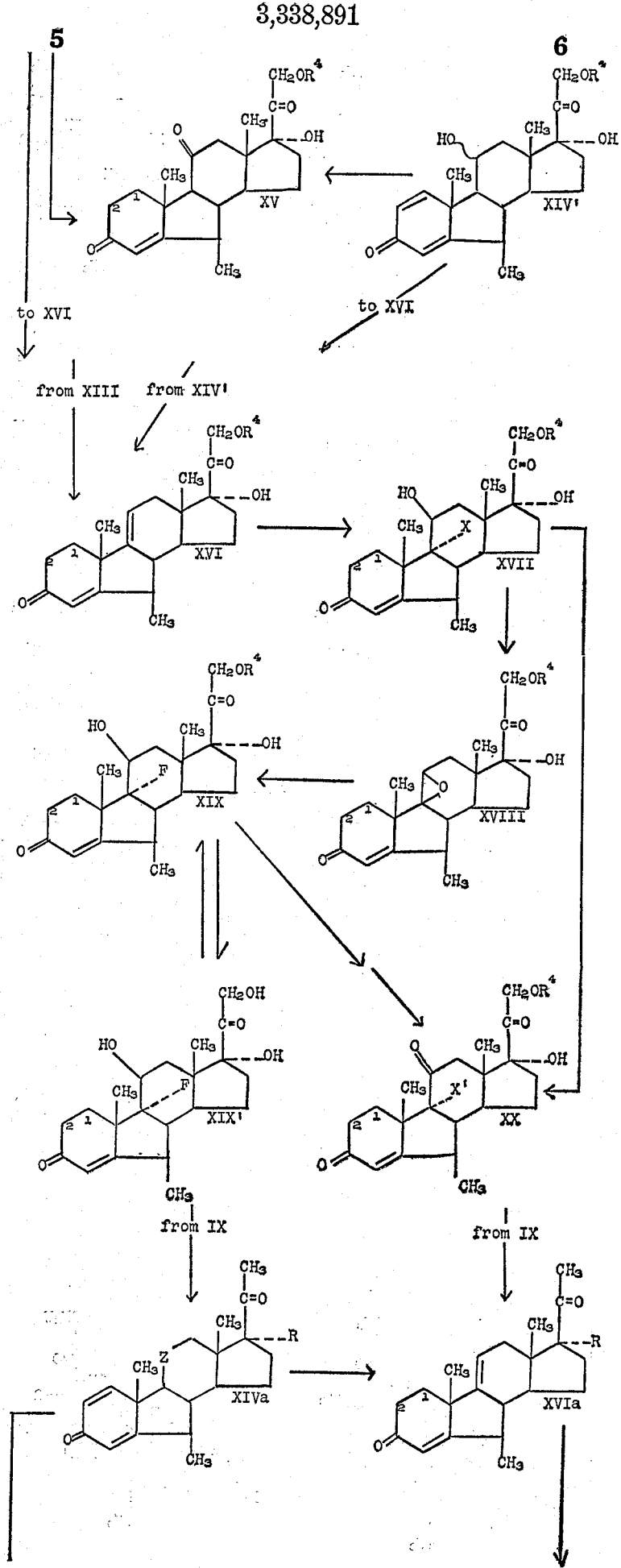

7 8
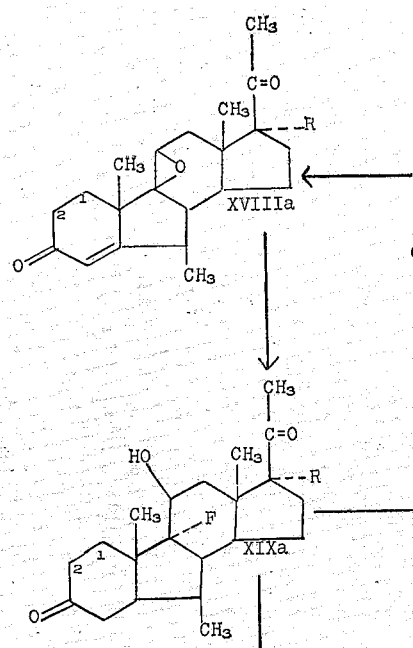
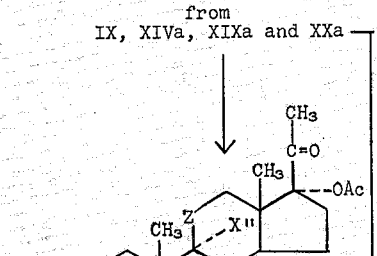
to IXa to IXa to IXa
from
IX, XIVa, XIXa and XXa
from
IX, XIII, XIII', XIV, XIV',
XV, XIX, XIX', XX, XIVa, XIXa
and XXa
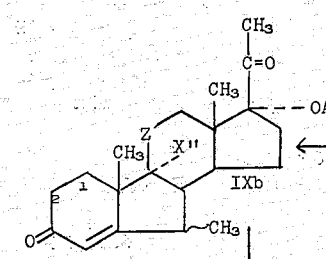
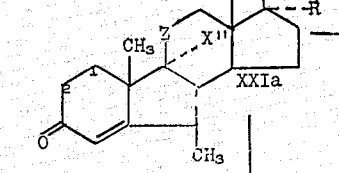
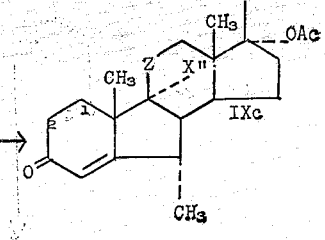
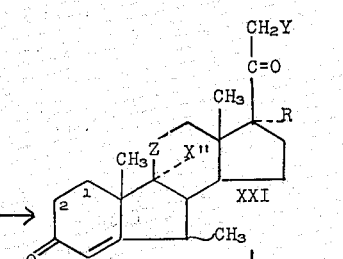
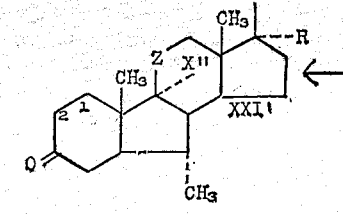

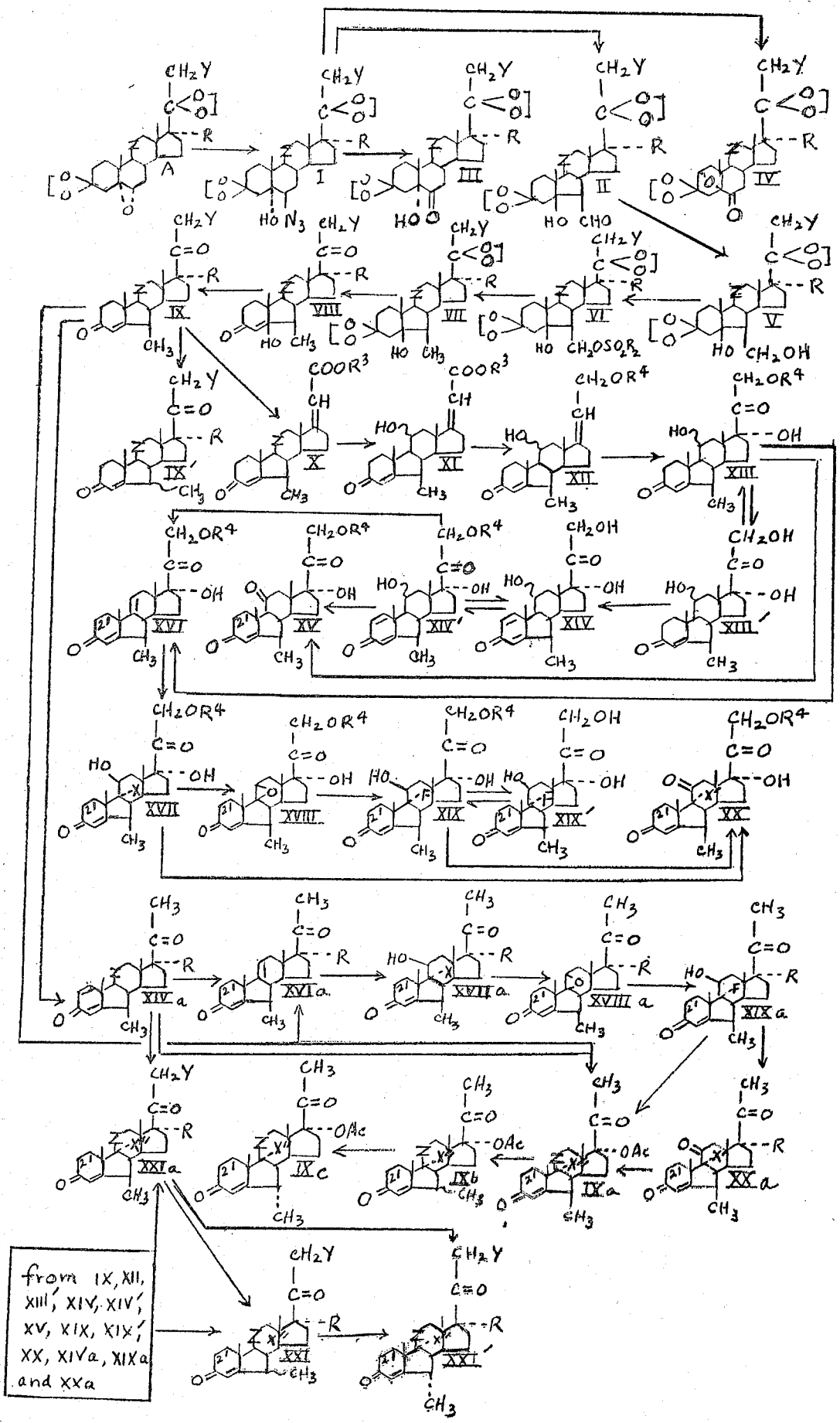

wherein the symbol

represents an alkylene ketal radical of the formula

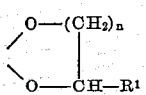

wherein $n$ is selected from the integers one and two and $R^1$ is selected from the group consisting of hydrogen and a lower-alkyl radical containing from one to six carbon atoms, inclusive; Y is selected from the group consisting of hydrogen, hydroxy and the lower-acyloxy radical of an organic carboxylic acid containing from one to twelve carbon atoms, inclusive; when Y is hydrogen and Z is selected from the group consisting of the β-hydroxymethylene radical

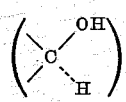

and the methylene radical $$(>CH_2)$$

R is selected from the group consisting of hydrogen, hydroxy and the lower-acyloxy radical (— — —OAc) wherein Ac is the acyl radical of an organic carboxylic acid containing from one to twelve carbon atoms, inclusive; when Y is selected from the group consisting of hydroxy and lower-acyloxy and X is selected from the group consisting of the methylene radical, the α-hydroxymethylene radical

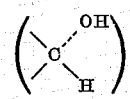

and the α-acyloxymethylene radical, R is selected from the group consisting of hydrogen and hydroxy; $R^2$ is an organic radical selected from the group consisting of alkyl and aryl radicals containing from one to ten carbon atoms, inclusive; $R^3$ is a lower-alkyl radical, i.e., one containing from one to eight carbon atoms, inclusive; $R^4$ is the acyl radical of an organic carboxylic acid containing from one to twelve carbon atoms, inclusive; X is a halogen selected from the group consisting of those having atomic weights of from 35 to 127, inclusive, i.e., chlorine, bromine or iodine; X' is a halogen selected from the group consisting of those having atomic weights of from 19 to 127, i.e., fluorine, chlorine, bromine or iodine; X" is selected from the group consisting of hydrogen, fluorine, chlorine, bromine and iodine; the 1,2-carbon linkage is selected from the group consisting of single bonds and double bonds; ~ is a generic expression denoting α- and β-bonds and mixtures thereof.

As used in this application, the Roman numeral following the name of a compound (or compounds) indicates the relation of the compound (or compounds) to the reaction scheme depicted above.

The novel compounds of this invention represented by the formula

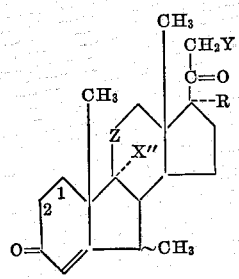

wherein 1,2-carbon linkage, the symbol ~, R, X", Y and Z have the same meanings as those set forth following the flow-sheet, above, and the intermediates for their preparation, possess valuable pharmacological properties as progestational and antiinflammatory agents.

The compounds wherein Y is hydrogen, e.g., 9α-fluoro-B - nor - 6β - methyl - 11β,7α-dihydroxy-14-pregnadiene-3,20-dione 17-acetate (IXa), are progestational agents of improved therapeutic ratio. These compounds are also useful, either alone, or in combination with an androgen (e.g., 17-methyltestosterone), or an estrogen (e.g., estradiol cyclopentylpropionate) in maintaining pregnancy and regulating fertility in valuable domestic animals.

The compounds wherein Y is selected from the group consisting of hydroxy and acyloxy possess marked antiinflammatory activity and are effective in the treatment of various inflammatory conditions of the skin, respiratory tract, bones and internal organs, contact dermatitis, rheumatoid arthritis and allergic reactions; the latter condition is especially responsive to topical application of the aforesaid compounds.

All of the compounds embraced by the above formula potentiate the emulsification of fats.

The compounds embraced by the above formula can be prepared and administered to mammals, birds and animals in a wide variety of oral and parenteral dosage forms, singly, or in admixture with other coacting compounds. They can be associated with a carrier which can be a solid material or a liquid in which the compound is dissolved, dispersed or suspended. The solid composition can take the form of tablets, powders, capsules, pills or the like, preferably in unit dosage forms for simple administration or precise dosage. The liquid compositions can take the form of solutions, emulsions, suspensions, syrups or elixirs.

The novel B-nor-6-methyl compounds represented by the composite formula set forth, above, are prepared by the routes shown in the flow-sheet, above, by the methods and reactions disclosed below.

(1) The first step of the process involves the 6β-azidylation of the known 5α,6α-epoxy compounds of Formula A [e.g., 5α,6α-epoxy-11α-hydroxypregnane - 3,20-dione, bis(alkylene ketal), 11-acelate (A)] with an alkali metal azide to yield the corresponding compounds of Formula I [e.g., 6β-azido-5α,11α-dihydroxypregnane - 3,20 - dione, bis(alkylene ketal), 11-acylate (I)].

(2) Irradiating the thus produced compounds of Formula I [e.g., 6β-azido - 5α,11α - dihydroxypregnane-3,20-dione, bis(alkylene ketal), 11-acylate (I)] with ultraviolet light gives the corresponding B-nor-5β-pregnane-6β-carboxaldehyde compounds (II) [e.g., 5α,11α-dihydroxy-B-nor-5β-pregnane-6β-carboxaldehyde - 3,20-dione, bis(alkylene ketal), 11-acylate (II)].

(3) Reducing the thus produced compounds of Formula II [e.g., 5α,11α - dihydroxy-B-nor-5β-pregnane-6β-carboxaldehyde-3,20-dione, bis(alkylene ketal), 11-acylate (II)] for example, with sodium borohydride, gives the corresponding B-nor-6β-hydroxymethyl-5β,11α-dihydroxypregnanes (V) [e.g., B - nor - 6β - hydroxymethyl-5β,11α - dihydroxypregnane-3,20-dione, bis(alkylene ketal), 11-acylate (V)].

(4) In the next step of the process the 6β-hydroxymethyl compounds (V) [e.g., B-nor-6β-hydroxymethyl-5β,11α-dihydroxypregnane - 3,20 - dione, bis(alkylene ketal), 11-acylate (V)] are reacted with an organic sulfonyl halide such as methanesulfonyl chloride, toluenesulfonyl bromide, benzenesulfonyl chloride, naphthalenesulfonyl chloride or the like, to obtain the corresponding 6β-sulfonate esters (VI) [e.g., B-nor-6β-p-toluenesulfonoxymethyl-5β,11α-dihydroxypregnane-3,20 - dione, bis(alkylene ketal), 11-acylate (VI)].

(5) Treating the sulfonoxy compounds of Formula VI [e.g., B-nor-6β - p - toluenesulfonoxymethyl-5β,11α-dihydroxypregnane-3,20-dione, bis(alkylene ketal), 11-acylate (VI)] with lithium aluminum hydride yields the corresponding 6β-methyl compounds (VII) [e.g., B-nor-6β- methyl-5β,11α-dihydroxypregnane - 3,20-dione, bis(alkylene ketal), 11-acylate (VII)].

(6) Subjecting the thus produced 6β-methyl compounds (VII) [e.g., B-nor-6β-methyl-5β,11α-dihydroxypregnane - 3,20-dione, bis(alkylene ketal), 11 - acylate (VII)] to hydrolysis of the 3- and 20-ketal groups employing conventional reagents, e.g., at moderate temperatures under mildly acidic conditions, yields the corresponding 3,20-diketo compounds (VIII) [e.g., B-nor-6β-methyl-5β,11α-dihydroxypregnane-3,20 - dione, 11-acylate (VIII)].

(7) Dehydrating the thus produced compounds of Formula VIII [e.g., B-nor-6β-methyl-5β,11α-dihydroxypregnane-3,20-dione, 11-acylate (VIII)], e.g., in an alcohol containing sodium hydroxide from which oxygen has been removed, gives the corresponding Δ⁴-6β-methyl compounds (IX) [e.g., B-nor-6β-methyl-11α-hydroxy-4-pregnene-3,20-dione, 11-acylate (IX)].

(8) Isomerizing the 6β-methyl compounds of Formula IX [e.g., B-nor-6β-methyl-11α-hydroxy-4-pregnene - 3,20-dione, 11-acylate (IX)], e.g., with dry hydrochloric acid in chloroform, yields the corresponding 6(α and β)-methyl compounds (IX') [e.g., B-nor-6(α and β)-methyl-11α-hydroxy-4-pregnene-3,20 - dione, 11 - acylate (IX')]. The B-nor-6(α and β)-methyl compounds (IX') can also be produced directly by the dehydration of those embraced by Formula VIII, e.g., by reaction in pyridine with thionyl chloride. The 6β-methyl compounds (IX) [e.g., B-nor-6β-methyl-11α-hydroxy-4-pregnene - 3,20 - dione, 11 - acylate (IX)] and the 6(α and β)-methyl compounds (IX') can both be converted to mixtures of the 6α- and 6β-epimers, e.g., by treating the methanol solutions thereof with a mineral acid such as sulfuric, hydrochloric, or the like, or with a base, preferably an alkali metal hydroxide such as sodium or potassium hydroxide or carbonate, in the manner disclosed in Example 17 of U.S. Patent 2,897,217.

The compounds of Formula IX can be converted to further substituted analogues by procedures known in the steroid art, certain of which transformations are set forth below.

(a) The compounds of Formula IX (wherein Y and R are hydrogen) [e.g., B-nor-6β-methyl - 11α - hydroxy - 4-pregnene-3,20-dione, 11-acylate (IX)] are converted to the corresponding lower-alkyl-4,17(20) - pregnadien - 21-oates (X) [e.g., methyl-B-nor-6β-methyl-11α-hydroxy-3-keto-4,17(20) - pregnadien - 21 - oate (X)] in accordance with the method of U.S. Patent 2,790,814.

(b) The thus produced 4,17(20) - pregnadiene (X) [e.g., methyl-B-nor-6β-methyl-11α-hydroxy-3 - keto - 4,17 (20)-pregnadien-21-oate (X)] is reduced e.g., with lithium aluminum hydride in the manner disclosed in U.S. Patent 2,781,343 or other chemical carboxyl reducing agent in an organic solvent to yield the corresponding 21-hydroxy compound [e.g., B-nor-6β-methyl-11α,21-dihydroxy-4,17(20)-pregnadien-3-one (XI)].

(c) The esterification of the 21-hydroxy group of the compounds of Formula XI [e.g., B-nor-6β-methyl-11α,21-dihydroxy-4,17(20)-pregnadien-3-one (XI)] can be carried out by methods known in the art, e.g., by the reaction of (XI) with the selected acid halide or the anhydride of a hydrocarbon carboxylic acid, or by reaction with the selected acid in the presence of an esterification catalyst or with an ester under ester exchange reaction conditions, to give the corresponding 21-acylate (XII) [e.g., B-nor-6β-methyl-11α,21-dihydroxyl-4,17(20)-pregnadien-3 - one 21-acylate (XII)].

(d) The oxidative hydroxylation of the thus produced esters (XII) [e.g., B-nor-6β-methyl-11α,21-dihydroxy-4,17(20)-pregnadien-3-one 21-acylate (XII)] with osmium tetroxide and an oxidizing agent, e.g., hydrogen peroxide, an organic peracid, an amine oxide peroxide or an aryl iodo oxide, in the manner described in U.S. Patents 2,769,825 and 2,769,823 yields the corresponding 11α,17α,21-trihydroxy 21-acylates (XII), e.g., B-nor-6β-methyl-11α,17α,21-trihydroxy-4-pregnene-3,20-dione 21 - acylate (XIII)]. Hydrolysis of these compounds (XIII) by alkali, preferably in a nitrogen atmosphere, produces the free triols (XIII') [e.g., B-nor-6β-methyl - 11α,17α,21 - trihydroxy-4-pregnene-3,20-dione (XIII')]. Esterification of the triols (XIII') with halides and anhydrides of organic carboxylic acids or organic carboxylic acids containing from one to twelve carbon atoms give the corresponding 21-acylates (XIII).

(e) The compounds of Formula XIII [e.g., B-nor-6β-methyl-11α,17α-21-trihydroxy - 4 - pregnene - 3,20 - dione (XIII') or its 21-acylate (XIII), preferably the 21-acetate, can be converted to numerous physiologically active steroids. For example, they can be dehydrogenated in the one position with a fungus capable of dehydrogenating at said position without otherwise degrading the nucleus, e.g., of the genus Septomyxa; 1(2)-dehydrogenation of the compounds (XIII) can also be carried out by treating them with selenium dioxide in the manner disclosed in U.S. Patent 2,971,886 and with dicyanodichlorobenzoquinone by the method disclosed in British Patent 852,847. By following one of these procedures the compounds embraced by Formula XIII [e.g., B-nor-6β-methyl-11α,17α, 21-trihydroxy-4-pregnene - 3,20 - dione (XIII')] are converted to the corresponding Δ¹-derivatives (XIV) [e.g., B-nor-6β-methyl-11α,17α,21-trihydroxy-1,4 - pregnadiene-3,20-dione (XIV)]. These compounds can in turn be esterified to produce their 21-acylates (XIV') according to methods known in the art.

The foregoing reactions exemplifying employment of the 11α-hydroxy compounds in (a) to (e), above, can also be carried out with the corresponding 11β-epimers.

(f) The compounds embraced by Formulae XIII [e.g., B-nor-6β-methyl-11β,17α,21-trihydroxy-4-pregnene-3,20-dione 21-acylate (XIII)] and XIV' [e.g., B-nor-6β-methyl-11β,17α,21-trihydroxy-1,4-pregnadiene-3,20 - dione 21-acylate (XIV')] can be oxidized with a N-haloamide or N-haloimide, e.g., N-bromoacetamide in pyridine or like amine, or with chromic acid or sodium dichromate, according to methods known in the art, to produce the corresponding 11-keto compounds (XV), which in turn can be hydrolyzed in the manner described in (d), above.

(g) The 9α-halo compounds of this invention can be prepared from both the 11α- and 11β-hydroxy compounds embraced by Formulae XIII [e.g., B-nor-6β-methyl-11β, 17α,21-trihydroxy - 4 - pregnene - 3,20 - dione 21 - acylate (XII)] and XIV' [e.g., B-nor-6β-methyl-11β,17α,21-trihydroxy-1,4-pregnadiene-3,20-dione 21-acylate (XIV')] in the manner disclosed in U.S. Patents 2,852,511; 2,923,722; 2,924,612 and 2,957,894. Dehydrating the compounds of Formulae XIII and XIV' in conventional manner, for example with an N-haloamide and sulfur dioxide, or alternatively for example with an acid such as sulfuric acid in acetic acid, gives the compounds of Formulae XVI, e.g., B-nor-6β-methyl-17α,21-dihydroxy-4,9(11) - pregnadiene-3,20-dione 21-acylate and the corresponding 1-dehydro derivatives; adding to a solution of the thus-obtained 4,9(11)-pregnadienes (XVI) and corresponding 1-dehydro analogues (XVI), dissolved in an organic solvent, a hypohalous acid, i.e., hypochlorous, hypoiodous or hypobromous acid, gives the corresponding 9α-halo-11β-hydroxy compounds (XVII) [e.g., 9α-bromo - B - nor - 6β-methyl-11β,17α,21-trihydroxy-4-pregnene-3,20 - dione 21-acylate and corresponding 1-dehydro analogue (XVII); treating the compounds of Formula XVII with a mild base to obtain the corresponding 9β,11β-oxido derivatives (XVIII) [e.g., B-nor-6β-methyl-9β,11β-epoxy-17α,21 - dihydroxy-4-pregnene-3,20-dione 21-acylate and its 1-dehydro counterpart (XVIII)]; treating these oxido compounds (XVIII) with a source of hydrogen fluoride to give the corresponding 9α-fluoro compounds (XIX) [e.g., 9α-fluoro-B-nor-6β-methyl-11β,17α,21-trihydroxy-4 - pregnene-3,20-dione 21-acylate and its 1-dehydro counterpart (XIX)]; oxidizing the thus-produced 11β-hydroxy compounds (XIX), e.g., with chromic acid, or hypohalous acid preferably produced in situ, results in the production of the corresponding 11-keto analogues (XX) [e.g., 9α-fluoro-B-nor-6β-methyl-17α,21-dihydroxy-4 - pregnene - 3,11,20-trione 21-acylate and its 1-dehydro derivative (XX)]; these compounds (XX) can be converted to their corresponding 21-hydroxy derivatives in the manner set forth in (d), above.

The compounds of Formulae IX of this invention, wherein Y is hydrogen, can also be converted to their corresponding 9α-halo derivatives by following the procedures disclosed in (g), above.

The compounds of Formulae IX wherein R is hydroxy, Y is hydrogen and Z is other than the α-hydroxymethylene radical are converted to their corresponding 17-acylates by esterifying the 17α-hydroxy group, e.g., with the anhydride of the selected acid in the presence of an acid catalyst, e.g., p-toluenesulfonic acid, in the manner disclosed in U.S. Patent 2,805,230 or in J. Amer. Chem. Soc., 74, 5394 (1952) for esterifying difficult esterifiable 17α-hydroxy steroids.

The 6β-methyl compounds of Formulae IX, XIII, XIII′, XIV, XIV′, XV, XIX, XIX′, XX, XIVa, XIXa and XXa can be isomerized to their 6(α and β)-methyl counterparts (XXI) and to their 6α-methyl epimers (XXI′) by the procedures disclosed in (8), above.

All of the compounds embraced by Formulae I through XXI′ can be isolated from their reaction mixtures by conventional means, for example, when a water-miscible solvent is used, by pouring the reaction mixture into water, and separating the resulting precipitate by filtration. Additional purification of the product can be accomplished by conventional methods, for example, by elution chromatography from an adsorbent column with a suitable solvent such as acetone, methanol, dilute methanol, ethanol, ether, methylene chloride and Skellysolve B (hexanes), mixtures and combinations of these solvents; also by gradient elution chromatography from an adsorbent column with a suitable mixture of solvents, such as methylene chloride-Skellysolve B, acetone-Skellysolve B, and the like.

EXAMPLE 1

*6β-azido-5α,11α-dihydroxypregnane-3,20-dione, bis(ethylene ketal), 11-acetate (I)*

Ten grams of 5α,6α-epoxy-11α-hydroxypregnane-3,20-dione, bis(ethylene ketal), 11-acetate (A) and 5 g. of sodium azide was dissolved in 200 ml. of dioxane and 50 ml. of water. The solution was heated to reflux under nitrogen for a period of about 5 days. The cooled solution was treated with 2 g. of activated charcoal and diluted to a volume of 500 ml. with water. The solid product was filtered, washed with water, and dried for about 16 hours in a vacuum oven at about 60° C. A 9.19 g. yield of crude product melting at 164 to 230° C. was obtained. This material was adsorbed onto 275 g. of Florisil (synthetic magnesium silicate) in methylene chloride and eluted with 21 fractions (each 375 ml. in volume) of a mixture of acetone and Skellysolve B (hexane hydrocarbons) over a gradient of from 5 to 20% acetone. Fractions 4 to 10 were combined and recrystallized from acetone to yield 3.44 g. of 6β-azido-5α,11α-dihydroxypregnane-3,20-dione, bis(ethylene ketal), 11-acetate (I) with a melting point of 184.5 to 185.5° C. A sample recrystallized twice for analysis melted at 184.5 to 185.5° C. and had an absorption γ max. at 3510, 2100, 1723 and 1250 $cm.^{-1}$.

*Analysis.*—Calcd. for $C_{27}H_{41}N_3O_7$: C, 62.41; H, 7.95; N, 8.09. Found: C, 62.43; H, 7.66; N, 8.19.

Following the procedure of Example 1, but substituting as starting materials, the other compounds embraced by Formula A of the flow-sheet in column 1, yields the corresponding compounds of Formula I thereof. Thus, replacing 5α,6α - epoxy-11α-hydroxypregnane-3,20-dione, bis(ethylene ketal), 11-acetate (A) by:

(1) 5α,6α-epoxy-11α-hydroxypregnane-3,20-dione, bis(ethylene ketal) (A),
(2) 5α,6α-epoxypregnane-3,20-dione, bis(ethylene ketal) (A),
(3) 5α,6α-epoxy-17α-hydroxypregnane-3,20-dione, bis(ethylene ketal) (A),
(4) 5α,6α-epoxy-11α,17α,21-trihydroxypregnane-3,20-dione, bis(ethylene ketal) (A) and
(5) 5α,6α-epoxy-11α,17α,21-trihydroxypregnane-3,20-dione, bis(ethylene ketal), 11-acetate (A), yields, respectively, (1) 6β-azido-5α,11α-dihydroxypregnane-3,20-dione, bis(ethylene ketal) (I),
(2) 6β-azido-5α-hydroxypregnane-3,20-dione, bis(ethylene ketal) (I),
(3) 6β-azido-5α,17α-dihydroxypregnane-3,20-dione, bis(ethylene ketal) (I),
(4) 6β-azido-5α,11α,17α,21-tetrahydroxypregnane-3,20-dione, bis(ethylene ketal), 11-acetate (I) and
(5) 6β-azido-5α,11α,17α,21-tetrahydroxypregnane-3,20-dione, bis(ethylene ketal), 11-acetate (I).

EXAMPLE 2

*6β-azido-5α,11β,17α,21-tetrahydroxypregnane-3,20-dione, bis(ethylene ketal) (I)*

A solution of 2 g. (4.3 moles) of 5α,6α-epoxy-11β,17α,21 - trihydroxypregnane-3,20-dione, bis(ethylene ketal) (A) and 400 mg. of sodium azide dissolved in 40 ml. of dioxane and 10 ml. of water was heated to reflux for a period of about 3 days. The solution was diluted with two volumes of water and most of the dioxane removed under reduced pressure. The gummy residue was separated and chromatographed on 100 g. of Florisil. 30% acetone in Skellysolve B eluted 250 mg. of crystalline material with a melting point of 189 to 194° C. A sample was recrystallized from acetone for analysis and yielded 6β - azido - 5α,11β,17α,21-tetrahydroxypregnane-3,20-dione, bis(ethylene ketal) (I), melting at 193.0 to 195.0° C.; infrared absorption spectrum with γ max. at 3520, 3420 (shoulder), 3380, 2120 (shoulder) and 2100 $cm.^{-1}$.

*Analysis.*—Calcd. for $C_{25}H_{39}N_3O_8$: C, 59.82; H, 7.71; N, 8.25. Found: C, 58.38; H, 7.95; N, 7.92.

Following the procedure of Example 2, but substituting as starting materials, the other compounds embraced by Formula A of the flow-sheet in column 1, yields the corresponding compounds of Formula I thereof.

EXAMPLE 3

*6β-azido-5α,11β,17α,21-tetrahydroxypregnane-3,20-dione, bis(ethylene ketal), 21-acetate (I)*

A solution of 3.09 g. of 6β-azido-5α,11β,17α,21-tetrahydroxypregnane-3,20-dione, bis(ethylene ketal) (I) in 25 ml. of pyridine was treated with 5 ml. of acetic anhydride at room temperature for a period of about 2 hours. The solution was then poured into 125 ml. of water and the product extracted with methylene chloride. The combined extracts were washed successively with water, 4% sodium bicarbonate solution, saturated sodium chloride solution, dried over sodium sulfate and evaporated to dryness under reduced pressure. The residue was adsorbed onto a chromatograph column of 150 g. of Florisil and eluted with three 1 liter fractions of 25% acetone-Skellysolve B. The product was recrystallized from acetone-Skellysolve B to give 2.17 g. of product melting at 201 to 203° C. (with decomposition). A sample was recrystallized for analysis and melted at 209 to 210° C. (with decomposition) and an infrared absorption spectrum consistent and indicating an acetone solvate of 6β-azido - 5α,11β,17α,21 - tetrahydroxypregnane-3,20-dione, bis(ethylene ketal), 21-acetate (I).

*Analysis.*—Calcd. for $C_{23}H_{33}O_7N_3 \cdot CH_3COCH_3$: C, 59.87; H, 7.54; N, 8.06. Found: C, 59.75; H, 7.68; N, 7.74.

An unsolvated product is obtained by prolonged heating in vacuo at 100° C.

EXAMPLE 4

*6β-azido-5α,11α-dihydroxypregnane-3,20-dione, 11-acetate (I')*

A 2 g. sample of 6β-azido-5α,11α-dihydroxypregnane-3,20-dione, bis(ethylene ketal), 11-acetate (I) was dissolved with warming in 40 ml. of ethanol and 2 ml. of 3 N hydrochloric acid and the resulting solution allowed to stand at room temperature for a period of about 16 hours. The solution was diluted with water to a volume of about 125 ml. to give a gummy yellow solid. This material was separated and washed by decantation. The residue was crystallized from a mixture of ethanol and water and had a melting point of 96 to 167° C. (with decomposition). Recrystallization from a mixture of acetone and Skellysolve B gave 640 mg. of product with a melting point of 206 to 207° C. (decomposition). A sample, recrystallized once for analysis had a melting point of 207 to 208.5° C. and an infrared absorption spectrum consistent with the structure of 6β-azido-5α,11α-dihydroxypregnane-3,20-dione, 11-acetate (I').

*Analysis.*—Calcd. for $C_{23}H_{33}N_3O_5$: C, 64.10; H, 7.71; N, 9.74. Found: C, 64.30; H, 7.52; N, 9.66.

EXAMPLE 5

*5β,11α-dihydroxy-B-nor-5β-pregnane-6β-carboxaldehyde-3,20-dione, bis(ethylene ketal), 11-acetate (II)*

*5α,11α-dihydroxy-5α-pregnane-3,6,20-trione, 3,20-bis(ethylene ketal), 11-acetate (III)*

Three grams of 6β-azido-5α, 11α-dihydroxypregnane-3,20-dione, bis(ethylene ketal), 11-acetate (I) in 700 ml. of ethanol was irradiated for about 1 hour in a quartz cell employing a 200 watt mercury vapor lamp at about 27° C. Thin layer chromatography employing Silica Gel G (amorphous silica) with 1:1 cyclohexane:ethyl acetate, indicated at this stage the absence of residual starting material. The solvent was removed under reduced pressure and the residue adsorbed onto a chromatographic column of 150 g. of Florisil. The products were eluted with thirty fractions of 250 ml. each over a gradient of from 2 to 20% acetone in Skellysolve B. Fractions 5 to 10 containing 1.21 g. of solid material were combined and recrystallized from a mixture of acetone and Skellysolve B to give 0.8 g. of colorless needles having a melting point of 173.5 to 176.5° C. A sample of this product recrystallized twice from ethanol and three times from a mixture of acetone and Skellysolve B gave pure 5α,11α-dihydroxy-5α-pregnane-3,6,20-trione, 3,20-bis(ethylene ketal), 11-acetate (III), having a melting point of 179 to 180.0° C.; infrared absorption γ max. 3515, 1720 and 1250 cm.$^{-1}$; nuclear magnetic resonance spectrum[1]: 18–H, 51 c.p.s., 19–H, 52 c.p.s., 21–H, 75 c.p.s., ketals, 235 to 238 c.p.s., CH$_3$CO, 119 c.p.s.

*Analysis.*—Calcd. for $C_{27}H_{40}O_8$: C, 65.83; H, 8.00. Found: C, 65.68; H, 8.06.

Fractions 12 to 15 containing 240 mg. of solid material were combined and recrystallized from a mixture of acetone and Skellysolve B to give 0.16 g. of hairlike clusters of crystals melting at 156 to 160° C. A sample of this product recrystallized from a mixture of acetone and Skellysolve B gave pure 5β,11α-dihydroxy-B-nor-5β-pregnane-6β-carboxaldehyde-3,20-dione, bis(ethylene ketal), 11-acetate (II), having a melting point of 157 to 160° C.; infrared absorption γ max. 3530, 2750, 1725, 1715 (shoulder), and 1250 cm.$^{-1}$; nuclear magnetic resonance spectrum: CHO, 580 c.p.s., 18–H, 54 c.p.s., 19–H, 57 c.p.s., 21–H, 74.5 c.p.s., ketals, 234 to 237 c.p.s. and CH$_3$CO, 119 c.p.s.

[1] All nuclear magnetic resonance spectra were obtained at 60 m.c.s. and chemical shifts are measured downfield from tetramethyl silane which equals 280 c.p.s.

*Analysis.*—Calcd. for $C_{29}H_{40}O_8$: C, 65.83; H, 8.00. Found: C, 66.19; H, 8.27.

Following the procedure of Example 5, but substituting as starting materials, the other compounds embraced by Formula I of the flow-sheet in column 2, yields the corresponding compounds of Formulae II and III thereof.

EXAMPLE 6

*2α,5α-epoxy-11α-hydroxypregnane-3,6,20-trione-3,20-bis(ethylene ketal), 11-acetate (IV)*

A 1 g. portion of 6β-azido-5α,11α-dihydroxypregnane-3,20-dione, bis(ethylene ketal), 11-acetate (I) was dissolved in 220 ml. of 95% ethanol then irradiated in a quartz cell employing a 200 watt mercury vapor lamp at about 27° C. for a period of about 12 hours. The solid that precipitated was filtered, washed with ethanol and dried to give 0.12 g. of product melting at 292 to 295° C. (decomposition). This material was recrystallized twice for analysis from acetone to yield pure 2α,5α-epoxy-11α-hydroxypregnane-3,6,20 - trione - 3,20 - bis(ethylene ketal), 11-acetate (IV), with a melting point of 298° C. (decomposition); infrared absorption γ max. at 1705, 1720 and 1750 cm.$^{-1}$ (shoulder); no OH, ultraviolet absorption negative; nuclear magnetic resonance spectrum; 18–H, 47 c.p.s., 19–H, 68 c.p.s., 21–H, 76 c.p.s.; ketals, 237 c.p.s. and 2α–H, 257 c.p.s.

*Analysis.*—Calcd. for $C_{27}H_{40}O_8$: C, 65.83; H, 8.19. Found: C, 65.94; H, 8.73.

Following the procedure of Example 6, but substituting as starting materials, the other compounds embraced by Formula I of the flow-sheet in column 2, yields the corresponding compounds of Formula IV thereof.

EXAMPLE 7

*B-nor-6β-hydroxymethyl-5β,11α-dihydroxypregnane-3,20-dione, bis(ethylene ketal), 11-acetate (V)*

One-quarter gram of 5β,11α-dihydroxy-B-nor-5β-pregnane-6β-carboxaldehyde-3,20-dione, bis(ethylene ketal), 11-acetate (II) in 7 ml. of tetrahydrofuran was treated with 50 mg. of sodium borohydride in 4 ml. of water at room temperature for about 10 minutes. A drop of acetic acid was added followed by 10 ml. of water. The tetrahydrofuran was removed under reduced pressure and the crystalline solid isolated and washed well with water to give 215 mg. of B-nor-6β-hydroxymethyl-5β,11α-dihydroxypregnane-3,20-dione, bis(ethylene ketal), 11-acetate (V), having a melting point of 164 to 166° C. and an infrared absorption spectrum consistent with its expected structure.

Following the procedure of Example 7, but substituting as starting materials, the other compounds embraced by Formula II of the flow-sheet in column 1, yields the corresponding compounds of Formula V thereof.

EXAMPLE 8

*B-nor-6β-hydroxymethyl-5β,11α-dihydroxypregnane-3,20-dione, 11-acetate (V')*

One-tenth gram of B-nor-6β-hydroxymethyl-5β,11α-dihydroxypregnane-3,20-dione, bis(ethylene ketal), 11-acetate (V) was taken up in 3 ml. of 67% acetic acid-water with warming. After about one hour the reaction mixture was diluted to 10 ml. with water and chilled in an ice-bath; the product crystallized as white needles melting at 212 to 213.2° C. Thin layer chromatography employing silica gel with 1:3 cyclohexane:ethyl acetate indicated only a single spot (by detection with hot 50% sulfuric acid-water). The compound, B-nor-6β-hydroxymethyl-5β,11α-dihydroxypregnane-3,20-dione, 11 - acetate (V') had an infrared absorption γ max. at 3380, 1725, 1702, 1240 and 1028 cm.$^{-1}$; optical rotary dispersion (dioxane) showed a negative cotton effect curve, characteristic of an A/B cis ring fusion.

*Analysis.*—Calcd. for $C_{23}H_{34}O_6$: C, 67.95; H, 8.43. Found: C, 68.01; H, 8.63.

Following the procedure of Example 8, but substituting as starting materials, the other compounds embraced by Formula V of the flow-sheet in column 1, yields the corresponding 3,20-diketones.

EXAMPLE 9

*B - nor - 6β - p-toluenesulfonoxymethyl-5β,11α-dihydroxypregnane-3,20-dione, bis(ethylene ketal), 11-acetate (VI)*

To a solution of 7.5 g. of B-nor-6β-hydroxymethyl-5β, 11α-dihydroxypregnane - 3,20 - dione bis(ethylene ketal), 11-acetate (V) dissolved in 75 cc. of pyridine and chilled to minus 10° C., a solution of 4.5 g. of p-toluenesulfonyl chloride dissolved in 35 ml. of pyridine is added dropwise, with stirring during a period of about 1 hour; the mixture is further stirred for about 1 hour at about minus 3° C. to minus 4° C. and allowed to stand for about 24 hours longer at room temperature. The reaction mixture is poured into ice water, extracted with ether and the extract washed successively with water, 5% sodium bicarbonate solution and water. After drying over sodium sulfate the ether is evaporated and the amorphous solid product collected and chromatographed on a Florisil column. Elution with benzene and benzene-chloroform (1:1) mixture gives an amorphous solid which is crystallized from ether to give pure B-nor-6β-p-toluenesulfonoxymethyl-5β,11α-dihydroxypregnane-3,20-dione, bis (ethylene ketal), 11-acetate (VI).

Following the procedure of Example 9, but substituting as starting materials, the other compounds embraced by Formula V of the flow-sheet in column 1, yields the corresponding compounds of Formula VI of the flow-sheet in column 1.

EXAMPLE 10

*B-nor-6β-methyl-5β,11α-dihydroxypregnane-3,20-dione, bis(ethylene ketal), 11-acetate (VII)*

A solution of 1 g. of B-nor-6β-p-toluenesulfonoxymethyl - 5β,11α - dihydroxypregnane-3,20-dione, bis(ethylene ketal), 11-acetate (VI) dissolved in 70 ml. of dry ether is added dropwise into a suspension of 300 mg. of lithium aluminum hydride in 100 ml. of dry ether with stirring and the mixture heated at reflux for a period of about 24 hours. Upon cooling, excess reagent is decomposed by the addition of ethyl acetate, the ether layer separated, washed with water and then with 2% sodium bicarbonate solution. After drying over sodium sulfate, the ether is evaporated and the amorphous solid residue obtained is dissolved in benzene. On standing the product crystallizes and on recrystallization from benzene yields pure B - nor - 6β-methyl-5β,11α-dihydroxypregnane-3,20-dione, bis(ethylene ketal), 11-acetate (VII).

Following the procedure of Example 10, but substituting as starting materials, the other compounds embraced by Formula VI of the flow-sheet in column 1, yields the corresponding compounds of Formula VII thereof.

EXAMPLE 11

*B-nor-6β-methyl-5β,11α-dihydroxypregnane-3,20-dione, 11-acetate (VIII)*

One-tenth gram of B-nor-6β-methyl-5β,11α-dihydroxypregnane - 3,20 - dione, bis(ethylene ketal), 11 - acetate (VII) is taken up in 3 ml. of 67% acetic acid-water with warming. After about one hour the reaction mixture is diluted to a volume of 10 ml. with water and chilled in an ice-bath. The product that crystallizes is chromatographed on a Florisil column. Elution with a benzene and benzene-chloroform 1:1 mixture gives pure B-nor-6β - methyl - 5β,11α - dihydroxypregnane - 3,20-dione, 11-acetate (VIII).

Following the procedure of Example 11, but substituting as starting materials the other compounds embraced by Formula VII of the flow-sheet in column 2, yields the corresponding compounds of Formula VIII thereof.

EXAMPLE 12

*B-nor-6β-methyl-11β-hydroxy-4-pregnene-3,20-dione, 11-acetate (IX)*

Nitrogen is bubbled through a solution of 0.1 g. of B-nor-6β-methyl - 5β,11α - dihydroxypregnane-3,20-dione, 11-acetate (VIII) in 18 ml. of alcohol denatured with methanol for a period of about 15 minutes. To this solution is added 1 ml. of 0.1 N sodium hydroxide solution which has also been similarly treated with nitrogen. The mixture is allowed to stand under nitrogen for about 24 hours, made slightly acid with acetic acid, and concentrated to dryness under reduced pressure at a temperature below 60° C. The residue is dissolved in 10 ml. of ether and 1 ml. of water, the ether layer is separated, washed with dilute sodium carbonate solution and water, dried over sodium sulfate and evaporated to dryness to give pure B-nor-6β-methyl-11α-hydroxy-4-pregnene-3,20-dione, 11-acetate (IX).

Following the procedure of Example 12, but substituting as starting materials, the other compounds embraced by Formula VIII of the flow-sheet in column 4, yields the corresponding compounds of Formula IX thereof.

EXAMPLE 13

*B-nor-6(α and/or β)-methyl-4-pregnene-3,20-dione (IX')*

To a solution of 0.1 g. of B-nor-6β-methyl-5β-hydroxypregnane-3,20-dione (VIII) in 2 ml. of pyridine chilled to about 0° C., 0.1 ml. of sulfuryl chloride is added dropwise with stirring; the mixture is allowed to stand at about 0° C. for about 10 minutes then poured into icewater. The reaction mixture is extracted with ether and the extract washed successively with dilute hydrochloric acid, dilute sodium bicarbonate solution and water, dried over sodium sulfate and the ether solution evaporated to leave a residue of 110 mg. The residue is chromatographed over alumina and elution with a benzene:hexane (1:1) mixture gives the crude product. Recrystallization from hexane affords B-nor-6(α and/or β)-methyl-4-pregnene-3,20-dione (IX').

Following the procedure of Example 13, but substituting as starting materials, the compounds embraced by Formula VIII of the flow-sheet in column 4 (wherein Z is hydrogen and Y is other than hydroxy), yields the corresponding compounds of Formula IX' thereof.

EXAMPLE 14

*Methyl-B-nor-6β-methyl-11α-hydroxy-3-keto-4,17(20) pregnadien-21-oate (X)*

A solution of 0.2 g. of B-nor-6β-methyl-11α-hydroxy-4-pregnene-3,20-dione, 11-actetate (IX) in 2 ml. of t-butyl alcohol and 0.3 ml. of ethyl oxalate is heated to about 60° C. under nitrogen. A solution of sodium methoxide in methanol (0.3 g. of a 26% solution) is added. Heating is stopped and the mixture allowed to cool to room temperature. After about an hour the reaction mixture is cooled in an ice bath, a solution comprising 0.07 g. of sodium acetate and 0.08 ml. of acetic acid in 4.5 ml. of methanol, previously cooled to 0° C., is added and the mixture stirred until nearly all of the precipitated sodium enolate is redissolved. The reaction mixture is cooled to about 0° C. and a solution of 0.3 g. of bromine in 0.3 ml. of methanol added at such a rate that the temperature does not rise above about 5° C., until a bromine color persists. After stirring for about 20 minutes, a solution of sodium methoxide in methanol (0.72g. of a 26% solution) is added. The reaction mixtures gives a crystalline precipitate on standing. After stirring for about an hour, 0.2 g. of zinc powder and 5 ml. of acetic acid is added. The reaction mixture is filtered through Supercel (diatomaceous earth), the solvent reduced in volume and the residue partitioned between methylene chloride and water. The organic extracts are washed with saturated sodium bicarbonate solution and the solvent removed in vacuo. The product is chromatographed over a 16 g. column of Florisil and the column eluted with 20 ml. portions of 8% and 10% acetone in Skellysolve B. A crystalline product is eluted with 10% acetone in Skellysolve B and recrystallized from methanol to yield pure methyl-B-nor-6β-methyl-11α-hydroxy-3-keto - 4,17(20) - pregnadien-21-oate (X).

In the above reaction other alkyl oxalates can be used such as methyl oxalate, propyl oxalate, isopropyl oxalate and so on. After the bromine addition instead of using sodium methoxide solution in Example 14, other alkali metal alkoxides can be used such as the sodium or potassium ethoxides, sodium or potassium isopropoxides and the like in the corresponding ethyl, isopropyl and other alkyl esters of B-nor-6β-methyl-11α-hydroxy-3-keto-4,17(20)-pregnadien-21-oate (X).

Following the procedure of Example 14, but substituting as starting materials, the compounds embraced by Formula IX of the flow-sheet in column 3 (wherein Y and R are hydrogen), yields the corresponding compounds of Formula X thereof.

EXAMPLE 15

*B-nor-6β-methyl-11α,21-dihydroxy-4,17(20) pregnadien-3-one (XI)*

A mixture of 0.2 g. of methyl-B-nor-6β-methyl-11α-hydroxy-3-keto-4,17(20)-pregnadien-21-oate (X), 4 ml. benzene, 0.1 ml. pyrrolidine and 5 mg. of p-toluenesulfonic acid is heated at reflux under nitrogen for about one hour. The solvent is removed in vacuo and the residue redissolved in 2.5 ml. of benzene and added to a prepared solution of 0.1 g. of lithium aluminum hydride in absolute ether and then washed with an additional 1 ml. portion of benzene. After stirring for about 2 hours at room temperature, the excess hydride is destroyed by the cautious addition of 5 ml. of ethyl acetate and 0.5 ml. of water. The solvent is removed in vacuo and then a solution of 0.5 ml. of acetic acid in 10 ml. of methanol added and stirred for about 15 minutes. Aqueous sodium hydroxide (0.25 g. dissolved in 2.5 ml. of water) is added and stirred for about 15 minutes. Three-tenths of a ml. of acetic acid is added and the solvent volume reduced by one-half in vacuo. A solution of 0.5 ml. of sulfuric acid in 9 ml. of water is added and the mixture stirred again for about 15 minutes. The mixture is then extracted twice with methylene chloride, the extracts washed with saturated sodium bicarbonate solution and the solvent removed in vacuo, to give a residue of B-nor-6β-methyl-11α, 21-dihydroxy-4,17(20)-pregnadien-3-one (XI).

Following the procedure of Example 15 but substituting as starting material, the 11β-hydroxy epimer also embraced by Formula X (wherein Z is other than hydrogen) of the flow-sheet in column 3, yields the corresponding 11β-hydroxy compound of Formula XI thereof.

EXAMPLE 16

*B-nor-6β-methyl-11α,21-dihydroxy-4,17(20) pregnadien-3-one 21-acetate (XII)*

The residue (XI) recovered from Example 15 is acetylated with 1 ml. of pyridine and 1 ml. of acetic anhydride. After standing for about 18 hours, the reaction mixture is diluted with water, 0.75 ml. of concentrated hydrochloric acid added and the products extracted twice with methylene chloride. The extracts are washed with sodium bicarbonate solution and the solvent removed. The product is chromatographed over 18 g. of Florisil and eluted with 20 ml. portions of 5% and 10% acetone in Skellysolve B. The crystalline product eluted with the 10% fractions is used directly in Example 17 without further purification; its infrared absorption spectrum is consistent with the expected structure of B-nor-6β-methyl-11α,21-dihydroxy-4,17(20)-pregnadien-3-one 21 - acetate (XII).

Using for the acylation, instead of acetic anhydride, propionic, butyric, hexanoic, isovaleric, β-cyclopentylpropionic, succinic, benzenesulfonic or other anhydrides, the corresponding propionate, butyrate, hexanoate, isovalerate, β-cyclopentylpropionate, succinate, benzenesulfonate and the like of B-nor-6β-methyl-11α,21-dihydroxy-4,17(20)-pregnadien-3-one (XII) is obtained.

Following the procedure of Example 16, but substituting as starting material, the 11β-hydroxy epimer also embraced by Formula XI of the flow-sheet in column 4, yields the corresponding 11β - hydroxy compound of Formula XII of the flow-sheet in column 4.

EXAMPLE 17

*B-nor-6β-methyl-11α,17α,21-trihydroxy-4-pregnene-3,20-dione 21-acetate (XIII)*

A reaction mixture containing 0.3 g. of B-nor-6β-methyl-11α,21-dihydroxy-4,17(20)-pregnadien-3-one 21-acetate (XII), 15 ml. of t-butyl alcohol, 1.5 ml. of dry pyridine, 0.3 g. of N-methyl-morpholine oxide-peroxide in 2 ml. of t-butyl alcohol and a solution of 1.5 mg. of osmium tetroxide in 1.5 ml. of t-butyl alcohol, is stirred for about 16 hours at room temperature. The solvent is then removed in vacuo and the residue partitioned between methylene chloride and water. The methylene chloride extract is dried over sodium sulfate and the solvent removed under reduced pressure. The residue is chromatographed over a 35 g. column of Florisil with 35 ml. portions of 10, 15 and 20% acetone in Skellysolve B. Recrystallization from methanol yields the desired product B-nor-6β-methyl-11α,17α,21-trihydroxy-4-pregnene - 3,20-dione 21-acetate (XIII).

Following the procedure of Example 17, but instead of B-nor-6α-methyl - 11α,21 - dihydroxy-4,17(20)-pregnadien-3-one 21-acetate (XII) substituting another corresponding 21-acylate therefor, e.g., one of those disclosed after Example 16, produces the corresponding B-nor-6β-methyl-11α,17α,21 - trihydroxy-4-pregnene - 3,20 - dione 21-acylate (XIII).

Following the procedure of Example 17, but replacing B-nor-6β-methyl-11α,21-dihydroxy-4,17(20) - pregnadien-3-one 21-acetate (XII) by the corresponding 11β-hydroxy epimer yields B-nor-6β-methyl-11β,17α,21-trihydroxy-4-pregnene-3,20-dione 21-acetate (XIII).

EXAMPLE 18

*B-nor-6β-methyl-11α,17α,21-trihydroxy-4-pregnene-3,20-dione (XIII')*

A current of nitrogen is passed for a period of about 15 minutes through a solution of 0.2 g. of B-nor-6β-methyl-11α,17α,21-trihydroxy-4-pregnene-3,20 - dione 21 - acetate (XIII) in 5 ml. of ethanol. To this solution is then added 1 ml. of 95% ethanol containing 0.1 g. of potassium carbonate, similarly purged with nitrogen. The mixture is allowed to stand in a nitrogen atmosphere for a period of about 4 hours then poured into water and neutralized by the addition of 5 hydrochloric acid. The precipitated material is collected on a filter and recrystallized three times from acetone and Skellysolve B hexanes to give light-colored, crystalline B-nor-6β-methyl-11α,17α,21 - trihydroxy-4-pregnene-3,20-dione (XIII').

B-nor-6β-methyl-11α,17α,21-trihydroxy-4-pregnene - 3, 20-dione (XIII') is converted to desired esters (XIII) by reaction with the appropriate acid anhydride, acid chloride or bromide, or by other methods known in the art, e.g. by ester exchange, acid in the presence of an esterification catalyst, etc., to produce B-nor-6β-methyl-11α,17α, 21-trihydroxy-4-pregnene-3,20-done 21 - acylates (XIII) which include those wherein the acyl radical of the 21-acylate group is the acyl radical of, for example, a lower aliphatic acid, e.g., formic, propionic, butyric, isobutyric, valeric, isovaleric, trimethylacetic, 2-methylbutyric, 3- ethylbutyric, hexanoic, diethylacetic, triethylacetic, heptanoic, octanoic, α-ethylisovaleric, a cyclic acid, e.g., cyclopropylidene-acetic, a cycloaliphatic acid, e.g., cyclopentylformic, cyclopentylacetic, β-cyclo-pentylpropionic, cyclohexylformic, cyclohexylacetic, β-cyclohexylpropionic, an aryl or alkaryl acid, e.g., benzoic 2, 3, or 4-methyl-benzoic, 2,3-, 2,4-, 2,5-, 2,6-, 3,4-, and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e.g., phenylacetic, phenylpropionic, diphenylacetic, triphenylacetic, a disbasic acid, (which can be converted to water soluble, e.g., sodium salts), e.g., succinic, glutaric, α-methylglutaric, β-methylglutaric, β,β-dimethylglutaric, adipic, pimelic, suberic, a hydroxy acid, e.g., glycolic, lactic, citric, tartaric, d-maleic, d-glyceric, mannonic, gluconic, salicylic, 2,3,4-trimethoxybenzoic, α-naphthoxyacetic, or other acyl acid.

Following the procedure of Example 18, but substituting another 21-acylate of B-nor-6β-methyl-11α,17α,21-trihydroxy-4-pregnene-3,20-dione (XIII) as starting material, also yields B-nor-6β-methyl-11α,17α,21-trihydroxy-4-pregnene-3,20-dione (XIII').

Following the procedure of Example 18, but replacing B-nor-6β-methyl-11α,17α,21-trihydroxy-4-pregnene-3,20-dione 21-acetate (XIII) by the corresponding 11β-hydroxy epimer, yields B-nor-6β-methyl-11β,17α,21-trihydroxy-4-pregnene-3,20-dione (XIII).

EXAMPLE 19

*B-nor-6β-methyl-11α,17α,21-trihydroxy-1,4-pregnadiene-3,20-dione (XIV)*

Sir 100-ml. portions of a medium in 250 ml. Erlenmeyer flasks containing 1% glucose, 2% corn steep liquor (60% solids) and tap water is adjusted to a pH of 4.9. This medium is sterilized for 45 minutes at 15 pounds per square inch pressure and inoculated with a one to two day growth of *Septomyxa affinis* A.T.C.C. 6737. The Erlenmeyer flasks are shaken at room temperature at about 24° C. for a period of three days. At the end of this period, this 600 ml. volume is used as an inoculum for 10 l. of the same glucose-corn steep liquor medium which in addition contained 10 ml. of an antifoam (a mixture of lard oil and octadecanol). The fermentor is placed into the water bath, adjusted to 28° C., and the contents stirred (at 300 r.p.m.) and aerated (0.5 l. of air per 10 l. of beer per minute). After 17 hours of incubation, when a good growth develops and the acidity rises to pH 6.7, 2 g. of B-nor-6β-methyl-11α,17α,21-trihydroxy-4-pregnene-3,20-dione (XIII') plus 1 g. of 3-ketobisnor-4-cholen-22-al, dissolved in 115 ml. of dimethylformamide, is added and the incubation carried out at the same temperature and aeration for 24 hours. The mycelium is filtered off and the steroidal material extracted with methylene chloride. The methylene chloride solution is evaporated to dryness and the resulting residue chromatographed over a Florisil column. The friction containing the desired product as determined by paper chromatography is separated, evaporated and the product recrystallized from acetone to give pure B-nor-6β-methyl-11α,17α,21-trihydroxy-1,4-pregnadiene-3,20-dione (XIV).

Following the procedure of Example 19, but replacing the starting material B-nor-6β-methyl-11α,17α,21-trihydroxy-4-pregnene-3,20-dione (XIII') by the corresponding 11β-hydroxy epimer, yields B-nor-6β-methyl-11β,17α,21-trihydroxy-1,4-pregnadiene-3,20-dione (XIV).

EXAMPLE 19A

*B-nor-6β-methyl-11β,17α-dihydroxy-1,4-pregnadiene-3,20-dione (XIVa)*

Following the procedure of Example 19, but substituting B-nor-6β-methyl-11β,17α-dihydroxy - 4 - pregnene - 3,20-dione (IX) for B-nor-6β-methyl-11α,17α,21-trihydroxy-4-pregnene-3,20-dione (XIII'), yields B-nor-6β-methyl-11β,17α-dihydroxy-1,4-pregnadiene-3,20-dione (XIVA).

Following the procedure of Example 19a, but substituting as starting materials for B-nor-6β-methyl-11β,17α-dihydroxy-4-pregnene-3,20-dione (IX) the other compounds embraced by Formula IX (wherein Y is hydrogen) of the flow-sheet in column 3, yields the corresponding compounds of Formula XIVa of the flow-sheet in column 4.

EXAMPLE 20

*B-nor-6β-methyl-11α,17α,21-trihydroxy - 1,4-pregnadiene-3,20-dione and the corresponding 11β-hydroxy epimer (XIV)*

Following the procedure of Example 19, but substituting a B-nor-6β-methyl-11α,17α,21 - trihydroxy - 4 - pregnene-3,20-dione 21-acylate (XIII) (or the corresponding 11β-hydroxy epimer thereof) as starting material is also productive of B-nor-6β-methyl-11α,17α,21-trihydroxy-1,4-pregnadiene-3,20-dione (or the corresponding 11β-hydroxy epimer) (XIV).

In the manner disclosed in the paragraph following Example 18, B-nor-6β-methyl-11α,17α,21-trihydroxy-1,4-pregnadiene-3,20-dione and the corresponding 11β-hydroxy epimer (XIV) are converted to desired esters such as B-nor-6β-methyl - 11α,17α,21 - trihydroxy-1,4-pregnadiene-3,20-dione 21-acetate (XIV'), B-nor-6β-methyl-11α,17α,21 - trihydroxy - 1,4 - pregnadiene - 3,20-dione 21-propionate (XIV') and the corresponding 11β hydroxy epimers (XIV').

EXAMPLE 21

*B-nor-6β-methyl-17α,21-dihydroxy-1,4-pregnadiene-3,11,20-trione 21-acetate (XV)*

To a solution of 2.5 millimoles of B-nor-6β-methyl-11α,17α,21-trihydroxy-1,4-pregnadiene-3,20-dione 21-acetate (XIV') and 2 ml. of pyridine in 75 ml. of tertiary butanol is added 500 mg. of N-bromoacetamide. The reaction mixture is maintained at room temperature for about 16 hours whereupon the solution is diluted with fifty ml. of water containing 500 mg. of sodium sulfite, and the mixture then concentrated at reduced pressure to about forty ml. The distillation residue is refrigerated, filtered, and the filter cake washed with water and then dried. It consists of B-nor-6β-methyl-17α,21-dihydroxy-1,4-pregnadiene-3,11,20-trione 21-acetate (XV).

Following the procedure of Example 21, but substituting the corresponding 11β-hydroxy epimer for the starting material employed therein, also yields B-nor-6β-methyl-17α,21-dihydroxy-1,4-pregnadiene-3,11,20 - trione 21-acetate (XV).

EXAMPLE 22

*B-nor-6β-methyl-17α,21-dihydroxy-4-pregnene-3,11,20-trione 21-acetate (XV)*

Following the procedure of Example 21, but substituting B-nor-6β-methyl-11β(or 11α),17α,21-trihydroxy-4-pregnene-3,20-dione 21-acetate (XIII) as starting compound, there is thus produced B-nor-6β-methyl-17α,21-dihydroxy-4-pregnene-3,11,20-trione 21-acetate (XV).

Similarly, substituting another 21-acylate of B-nor-6β-methyl - 11β(or 11α),17α,21-trihydroxy-1,4-pregnadiene-3,20-dione (XIV') or 21-acylate of B-nor-6β-methyl-11β (or 11α),17α,21-trihydroxy-4-pregnene-3,20-dione (XIII) wherein the acyl radical is, e.g., that of an acid named in the paragraph following Example 18, as the starting compound in the oxidation reaction described in Example 21, there is thus produced the corresponding 21-acylate of B-nor-6β-methyl-17α,21 - dihydroxy - 1,4 - pregnadiene-3,11,20-trione (XV) and of B-nor-6β-methyl-17α,21-dihydroxy-4-pregnene-3,11,20-trione (XV), respectively.

EXAMPLE 23

*B-nor-6β-methyl-17α,21-dihydroxy-1,4,9(11)-pregnatriene-3,20-dione 21-acetate (XVI)*

To a solution of 0.5 g. of B-nor-6β-methyl-11β,17α,21- trihydroxy - 1,4 - pregnadiene - 3,20 - dione 21 - acetate (XIV′) in 4.2 ml. of pyridine is added 0.563 g. of N-bromoacetamide. After standing at room temperature for a period of about fifteen minutes, the reaction solution is cooled to 5 to 10° C. and sulfur dioxide gas passed over the surface of the solution while shaking the flask until the solution gives no color with acidified starch-iodide paper. During the addition of the sulfur dioxide, the reaction mixture becomes warm. The temperature is kept under 30° C. by external cooling and by varying the rate of sulfur dioxide addition. Thereafter to the reaction mixture is added 400 ml. of ice water and the resulting precipitate collected by filtration. This material is recrystallized from acetone-Skellysolve B hexanes to give B-nor - 6β - methyl - 17α,21-dihydroxy-1,4,9(11)-pregnatriene-3, 20-dione 21-acetate (XVI).

EXAMPLE 24

B-nor-6β-methyl-17α,21-dihydroxy-4,9(11)-pregnadiene-3,20-dione 21-acetate (XVI)

Following the procedure of Example 23, but substituting B - nor - 6β-methyl - 11β,17α,21 - trihydroxy - 4-pregnene-3,20-dione 21-acetate (XIII) as the starting compound, there is thus produced B-nor-6β-methyl-17α, 21 - dihydroxy-4,9(11)-pregnadiene-3,20-dione 21-acetate (XVI).

Similarly, substituting another 21-acylate of B-nor-6β - methyl - 11β,17α,21 - trihydroxy - 1,4 - pregnadiene-3,20-dione (XIV′) or a 21-acylate of B-nor-6β-methyl-11β,17α,21 - trihydroxy - 4 - pregnene-3,20-dione (XIII) wherein the acyl radical is, e.g., that of an acid named in the paragraph following Example 18, as the starting compound in the dehydration reaction described in Example 23, there is thus produced the corresponding 21-acylate of B-nor-6β-methyl-17α,21-dihydroxy-1,4,9(11)-pregnatriene-3,20-dione (XVI) and of B-nor-6β-methyl-17α,21 - dihydroxy - 4,9(11) - pregnadiene - 3,20 - dione (XVI), respectively.

EXAMPLE 25

9α-bromo-B-nor-6β-methyl-11β,17α,21-trihydroxy-1,4-pregnadiene-3,20-dione 21-acetate (XVII)

To a solution of 0.5 g. of B-nor-6β-methyl-17α,21-dihydroxy - 1,4,9(11) - pregnatriene-3,20-dione 21-acetate (XVI) in 10 ml. of methylene chloride and 25 ml. of tertiary butyl alcohol is added a solution of 1.4 ml. of 72% perchloric acid in 10 ml. of water followed by a solution of 0.2 g. of N-bromoacetamide in 6 ml. of tertiary butyl alcohol. After stirring the reaction mixture for about 15 minutes, a solution of 0.3 g. of sodium sulfite in 14 ml. of water is added and the reaction mixture concentrated to a volume of about 50 ml. under reduced pressure at about 50° C. The concentrate is cooled in an ice bath and while stirring 50 ml. of water is added. After stirring for a period of about 1 hour, the precipitated product is isolated by filtration, and the cake washed with water and air dried to give 9α-bromo-B-nor-6β - methyl - 11β,17α,21 - trihydroxy - 1,4 - pregnadiene-3,20-dione 21-acetate (XVII).

EXAMPLE 26

9α-bromo-B-nor-6β-methyl-11β,17α,21-trihydroxy-4-pregnene-3,20-dione 21-acetate (XVII)

Following the procedure of Example 25, but substituting B - nor - 6β - methyl - 17α,21 - dihydroxy-4,9(11)-pregnadiene-3,20-dione 21-acetate (XVI) as the starting compound, there is thus produced 9α-bromo-B-nor-6β-methyl-11β,17α,21-trihydroxy - 4 - pregnene - 3,20 - dione 21-acetate (XVII).

Similarly, substituting another 21-acylate of B-nor-6β - methyl - 17α,21 - dihydroxy-1,4,9(11)-pregnatriene-3,20-dione (XVI) or a 21-acylate of B-nor-6β-methyl-17α,21-dihydroxy-4,9(11)-pregnadiene-3,20-dione (XVI) wherein the acyl radical is, e.g., that of an acid named in the paragraph following Example 18, as the starting compound in the reaction described in Example 25, there is thus produced the corresponding 21-acylate of 9α-bromo-B-nor-6β-methyl-11β,17α,21-trihydroxy - 1,4-pregnadiene-3,20-dione (XVII) and of 9α-bromo-B-nor-6β-methyl-11β, 17α,21-trihydroxy-4-pregnene-3,20-dione (XVII), respectively.

Substituting N-chlorosuccinimide for the N-bromoacetamide in the reactions described in Examples 25, 26 and the paragraph following Example 26 is productive of the corresponding 9β-chloro compounds, e.g., 9α - chloro - B - nor - 6β - methyl - 11β, 17α,21 - trihydroxy - 1,4 - pregnadiene - 3,20 - dione 21-acetate (XVII) and 9α-chloro-B-nor - 6β,17α,21 - trihydroxy - 4 - pregnene-3,20-dione 21-acetate (XVII).

EXAMPLE 27

B-nor-6β-methyl-9β,11β-epoxy-17α,21-dihydroxy-1,4-pregnadiene-3,20-dione 21-acetate (XVIII)

To a solution of 0.6 g. of 9α-bromo-B-nor-6β-methyl-11β,17α,21-trihydroxy - 1,4 - pregnadiene - 3,20 - dione 21-acetate (XVII) in 17.5 ml. of acetone is added 0.6 g. of potassium acetate and the resulting suspension heated under reflux for a period of about 17 hours. The mixture is then concentrated to approximately 60 ml. volume at reduced pressure on the steam bath, diluted with water and extracted with methylene chloride. The methylene chloride extracts are combined, washed with water, dried over anhydrous sodium sulfate and evaporated. The residue is redissolved in methylene chloride and chromatographed over 50 g. of Florisil. The column is eluted with 1 l. portion of Skellysolve B containing increasing proportions of acetone. There is thus eluted B-nor-6β-methyl-9β,11β-epoxy-17α,21-dihydroxy-1,4 - pregnadiene - 3,20-dione 21-acetate (XVIII) which is freed of solvent by evaporation of the eluates.

EXAMPLE 28

B-nor-6β-methyl-9β,11β-epoxy-17α,21-dihydroxy-4-pregnene-3,20-dione 21 acetate (XVIII)

Following the procedure of Example 27, but substituting 9α-bromo-B-nor-6β-methyl-11β,17α,21-trihydroxy-4-pregnene-3,20-dione 21-acetate (XVII) as the starting compound, there is thus produced B-nor-6β-methyl-9β, 11β-epoxy-17α,21-dihydroxy - 4 - pregnene - 3,20 - dione 21-acetate (XVIII).

Similarly, substituting another 21-acylate of 9α-bromo-B-nor - 6β - methyl - 11β,17α,21 - trihydroxy - 1,4 - pregnadiene-3,20-dione (XVII) or a 21-acylate of 9α-bromo-B-nor-6β-methyl - 11β,17α,21 - trihydroxy - 4 - pregnene-3,20-dione (XVII) wherein the acyl radical is, e.g., that of an acid named in the paragraph following Example 18, as the starting compound in the reaction described in Example 27, there is thus produced the corresponding 21-acylate of B - nor - 6β-methyl-9β,11β-epoxy-17α,21-dihydroxy-1,4-pregnadiene-3,20-dione (XVIII) and of B-nor-6β-methyl-9β,11β-epoxy-17α,21-dihydroxy-4 - pregnene-3, 20-dione (XVIII), respectively.

EXAMPLE 29

9α-fluoro-B-nor-6β-methyl-11β,17α,21-trihydroxy 1,4-pregnadiene-3,20-dione 21-acetate (XIX)

To approximately 1.3 g. of hydrogen fluoride contained in a polyethylene bottle and maintained at minus 60° C. is added 2.3 ml. of tetrahydrofuran and then a solution of 500 mg. of B-nor-6β-methyl-9β,11β-epoxy-17α,21-dihydroxy-1,4-pregnadiene-3,20-dione 21-acetate (XVIII) in 2 ml. of methylene chloride. The steroid solution is rinsed in with an additional 1 ml. of methylene chloride. The light red colored solution is then kept at approximately minus 30° C. for about one hour and at minus 10° C. for about two hours. At the end of this period it is mixed cautiously with an excess of cold sodium bicarbonate solution and the organic material extracted with the aid of additional methylene chloride. The combined extracts are washed with water, dried over anhydrous sodium sulfate and concentrated to approximately 35 ml. The solution is chromatographed over 130 g. of Florisil. The column is developed with 260-ml. portions of Skellysolve B containing increasing proportions of acetone. There is thus eluted 9α-fluoro-B-nor-6β-methyl-11β,17α,21-trihydroxy-1,4-pregnadiene-3,20-dione 21-acetate (XIX) which is freed of solvent by evaporation of the eluate fractions.

EXAMPLE 30

*9α-fluoro-B-nor-6β-methyl-11β,17α,21-trihydroxy-4-pregnene-3,20-dione 21-acetate (XIX)*

Following the procedure of Example 29, but substituting B - nor - 6β-methyl-9β,11β-epoxy-17α,21-dihydroxy-4-pregnene-3,20-dione 21-acetate (XVII) as the starting compound, there is thus produced 9α-fluoro-B-nor-6β-methyl - 11β,17α,21 - trihydroxy - 4 - pregnene - 3,20-dione 21-acetate (XIX).

Similarly, substituting another 21-acylate of B-nor-6β-methyl - 9β,11β - epoxy - 17α,21 - dihydroxy - 1,4 - pregnadiene-3,20-dione (XVIII) or a 21-acylate of B-nor-6β-methyl - 9β,11β - epoxy - 17α,21 - dihydroxy - 4 - pregnene-3,20-dione (XVII) wherein the acyl radical is, e.g., that of an acid named in the paragraph following Example 18, as the starting compound in the reaction described in Example 29, there is thus produced the corresponding 21-acylate of 9α - fluoro - B - nor - 6β - methyl-11β,17α,21-trihydroxy-1,4-pregnadiene-3,20-dione (XIX) and of 9α-fluoro-B-nor-6β-methyl-11β,17α,21-trihydroxy-4-pregnene-3,20-dione (XIX), respectively.

EXAMPLE 31

*9α-fluoro-B-nor-6β-methyl-17α,21-dihydroxy-1,4-pregnadiene-3,11,20-trione 21-acetate (XX)*

A solution is prepared containing 1 ml. of acetic acid, 50 mg. of 9α-fluoro-B-nor-6β-methyl-11β,17α,21-trihydroxy-1,4-pregnadiene-3,20-dione 21-acetate (XIX), 20 mg. of chromic anhydride and one drop (approximately 50 mg.) of water. This mixture is shaken several times at room temperature and allowed to stand for about four hours. Thereafter it is poured into 10 ml. of water and refrigerated for about 20 hours at about 5° C. The steroid which separates from the aqueous mixture is collected on filter paper and dried to give 9α-fluoro-B-nor-6β-methyl-17α,21 - dihydroxy-1,4-pregnadiene-3,11,20-trione 21-acetate (XX).

EXAMPLE 32

*9α-fluoro-B-nor-6β-methyl-17α,21-dihydroxy-4-pregnene-3,11,20-trione 21-acetate (XX)*

Following the procedure of Example 31, but substituting 9α - fluoro - B-nor-6β-methyl-11β,17α,21-trihydroxy-4-pregnene-3,20-dione 21-acetate (XIX) as the starting compound, there is thus produced 9α-fluoro-B-nor-6β-methyl - 17α,21 - dihydroxy - 4 - pregnene - 3,11,20 - trione 21-acetate (XX).

Similarly, substituting another 21-acylate of 9α-fluoro-B - nor - 6β - methyl - 11β,17α,21 - trihydroxy - 1,4 - pregnadiene-3,20-dione (XIX) or a 21-acylate of 9α-fluoro-B-nor - 6β - methyl - 11β,17α,21 - trihydroxy - 4 - pregnene-3,20-dione (XIX) wherein the acyl radical is, e.g., that of an acid named in the paragraph following Example 18, as the starting compound in the oxidation reaction described in Example 31, there is thus produced the corresponding 21-acylate of 9α - fluoro - B - nor - 6β - methyl - 17α,21-dihydroxy-1,4-pregnadiene-3,11,20-trione (XX) and of 9α-fluoro - B - nor - 6β - methyl - 17α,21 - dihydroxy - 4-pregnene-3,11,20-trione (XX), respectively.

EXAMPLE 33

*9α-fluoro-B-nor-6β-methyl-11β,17α,21-trihydroxy-1,4-pregnadiene-3,20-dione (XIX')*

Three hundred mg. of 9β - fluoro - B - nor - 6β - methyl-11β,17α,21 - trihydroxy - 1,4 - pregnadiene - 3,20 - dione 21-acetate (XIX) is dissolved in 32 ml. of methanol, previously purged of air-oxygen by passing nitrogen through it for ten minutes and thereto is added a solution of 160 mg. of potassium bicarbonate in 3 ml. of water, similarly purged of oxygen. The mixture is allowed to stand at room temperature for a period of about 5 hours in a nitrogen atmosphere, thereupon neutralized with 0.2 ml. of acetic acid in 4 ml. of water. The mixture is concentrated to approximately one-third volume at reduced pressure on a 60° C. water-bath. Thereupon 25 ml. of water is added and the mixture chilled. The crystalline product is collected on a filter, washed with water and dried to give 9α-fluoro-B-nor-6β-methyl-11β,17α,21-trihydroxy-1,4-pregnadiene-3,20-dione (XIX').

EXAMPLE 34

*9α-fluoro-B-nor-6β-methyl-11β,17α,21-trihydroxy-4-pregnene-3,20-dione (XIX')*

Following the procedure of Example 33, but substituting 9α - fluoro - B-nor-6β-methyl-11β,17α,21-trihydroxy-4-pregnene-3,20-dione 21-acetate (XIX) as the starting compound, there is thus produced 9α-fluoro-B-nor-6β-methyl - 11β,17α,21 - trihydroxy - 4 - pregnene - 3,20-dione (XIX').

Similarly, 9α-fluoro-B-nor-6β-methyl-17α,21-dihydroxy-4-pregnene-3,11,20-trione 21-acetate (XX) is hydrolyzed to 9α - fluoro - B - nor-6β-methyl-17α,21-dihydroxy-4-pregnene-3,11,20-trione and 9α-fluoro-B-nor-6β-methyl-17α,21-dihydroxy-1,4-pregnadiene-3,11,20-trione 21-acetate (XX) is hydrolyzed to 9α-fluoro-B-nor-6β-methyl-17α,21-dihydroxy-1,4-pregnadiene-3,11,20-trione. The corresponding 9α-chloro compounds are similarly prepared by hydrolysis of their 21 - acetates, e.g., 9α-chloro-B-nor-6β-methyl-11β,17α,21-trihydroxy-1,4-pregnadiene-3,20-dione and 9α-chloro - B - nor - 6β - methyl - 11β,17α,21 - trihydroxy - 4-pregnene-3,20-dione are prepared from 9α-chloro-B-nor-6β - methyl - 11β,17α,21 - trihydroxy - 1,4 - pregnadiene-3,20-dione 21-acetate and from 9α-chloro-B-nor-6β-methyl - 11β,17α,21 - trihydroxy-4-pregnene-3,20-dione 21-acetate, respectively.

EXAMPLE 35

*9α - fluoro - B - nor - 6β - methyl - 11β,17α,21 - trihydroxy-4-pregnene-3,20-dione 21-hemisuccinate, sodium salt (XIX)*

(a) A solution is prepared containing excess succinic anhydride and 9α-fluoro-B-nor-6β-methyl-11β,17α,21-trihydroxy-4-pregnene-3,20-dione (XIX') (prepared in the manner disclosed in Example 34) in pyridine. The solution is allowed to stand for about 20 hours, diluted with water and the mixture refrigerated and filtered. The precipitate collected on the filter is recrystallized twice from methanol to yield 9α-fluoro-B-nor-6β-methyl-11β,17α,21-trihydroxy - 4 - pregnene - 3,20 - dione 21 - hemisuccinate (XIX).

(b) 0.1 normal sodium hydroxide solution is slowly added to a stirred solution of 9α-fluoro-B-nor-6β-methyl-11β,17α,21-trihydroxy-4-pregnene-3,20 - dione 21 - hemisuccinate dissolved in acetone, until the pH rises to about 7.4. During the addition of sodium hydroxide solution, a small amount of water is also added. The solution is concentrated at room temperature under vacuum to remove the acetone. The aqueous solution is filtered, freeze-dried and recrystallized to give pure 9α-fluoro-B-nor-6β-methyl-11β,17α,21-trihydroxy-4-pregnene-3,20-dione 21-hemisuccinate, sodium salt (XIX).

Following the procedure of Example 35, but substituting, as starting materials, 9α-fluoro-B-nor-6β-methyl-11β,17α,21 - trihydroxy - 1,4 - pregnadiene - 3,20 - dione (XIX'), B-nor-6β-methyl-11β,17α,21-trihydroxy-4 - pregnene-3,20-dione (XIII') and B-nor-6β-methyl-11β,17α,21-trihydroxy-1,4-pregnadiene-3,20-dione (XIV) (prepared in the manner disclosed in Examples 33, 18 and 19, respectively) is productive of 9α-fluoro-B-nor - 6β - methyl- 11β,17α,21-trihydroxy-1,4-pregnadiene - 3,20 - dione 21-hemisuccinate sodium salt (XIX), B - nor - 6β - methyl-11β,17α,21-trihydroxy-4-pregnene-3,20-dione 21-hemisuccinate, sodium salt (XIII) and B-nor-6β-methyl-11β,17α,21-trihydroxy-1,4-pregnadiene-3,20 - dione 21 - hemisuccinate, sodium salt (XIV'), respectively.

EXAMPLE 36

*9α-fluoro-B-nor-6β-methyl-11β,17α,21-trihydroxy 1,4-pregnadiene-3,20-dione 21-propionate (XIX)*

A solution is prepared containing 50 mg. of 9α-fluoro-B-nor-6β-methyl-11β,17α,21 - trihydroxy - 1,4 - pregnadiene-3,20-dione (XIX') in 1 ml. of pyridine and 1 ml. of propionic anhydride. The solution is allowed to stand at room temperature for a period of about 21 hours and is thereupon poured into 10 ml. of water. The reaction mixture is then extracted with three 10 ml. portions of methylene chloride, the methylene chloride extracts are combined, washed with water, dried over anhydrous sodium sulfate and evaporated to give a residue of 9α-fluoro-B-nor-6β - methyl - 11β,17α,21 - trihydroxy - 1,4-pregnadiene-3,20-dione 21-propionate (XIX).

EXAMPLE 37

*9α-fluoro-B-nor-6β-methyl-11β,17α,21-trihydroxy-4-pregnene-3,20-dione 21-propionate (XIX)*

Following the procedure of Example 36, but substituting 9α-fluoro-B-nor-6β-methyl-11β,17α,21-trihydroxy - 4-pregnene-3,20-dione (XIX') as starting compound, there is thus produced 9α-fluoro-B-nor-6β-methyl - 11β,17α,21-trihydroxy-4-pregnene-3,20-dione 21 - propionate (XIX).

Similarly, 9α-fluoro-B-nor-6β-methyl-17α,21-dihydroxy-1,4-pregnadiene-3,11,20-trione is converted to 9β-fluoro-B-nor - 6β - methyl - 17α,21 - dihydroxy - 1,4 - pregnadiene-3,11,20-trione 21-propionate (XX) and 9α - difluoro - 6β-methyl-17α,21-dihydroxy - 4 - pregnene - 3,11,20 - trione is converted to 9α-fluoro-B-nor-6β - methyl - 17α,21 - dihydroxy-4-pregnene-3,11,20-trione 21 - propionate (XX).

Similarly, substituting another acylating agent for the propionic anhydride in the esterification of 9α-fluoro-B-nor-6β-methyl-11β,17α,21 - trihydroxy - 1,4-pregnadiene-3,20-dione (XIX') or 9α - fluoro - B - nor - 6β - methyl-11β,17α,21-trihydroxy-4-pregnene - 3,20 - dione (XIX'), e.g., in the manner described in the paragraph following Example 18, there is thus produced other 21-acylates of 9α-fluoro-B-nor-6β-methyl - 11β,17α21 - trihydroxy - 1,4-pregnadiene-3,20-dione (XIX) and of 9α-fluoro - B - nor-6β-methyl-11β,17α,21 - trihydroxy - 4 - pregnene - 3,20-dione (XIX), respectively.

EXAMPLE 38

*21-desoxy compounds (XVIa, XVIIa, XVIIIa, XIXa and XXa)*

In the same manner as shown in Examples 23 to 37, inclusive, for preparing the 21-oxygenated compounds represented by Formulae XVI, XVII, XVIII, XIX and XX of the flow-sheet in columns 5 and 6, the processes disclosed therein can be employed in the preparation of the corresponding 21-desoxy compounds embraced by Formulae XVIa, XVIIa, XVIIIa, XIXa and XXa of columns 6, 7 and 8 (from the compounds of Formula IX of the flow-sheet in column 3, wherein Y is hydrogen and Z is the b-hydroxymethylene radical).

EXAMPLE 39

*9α-fluoro-B-nor-6β-methyl-11β,17α-dihydroxy-1,4-pregnadiene-3,20-dione 17-acetate (IXa)*

A solution of 0.2 g. of 9α-fluoro-B - nor - 6β - methyl-11β,17α-dihydroxy-1,4-pregnadiene-3,20 - dione (XIXa) (prepared in the manner disclosed in Example 38), 0.5 ml. of distilled acetic anhydride, 50 mg. of p-toluenesulfonic acid and 0.5 ml. of acetic acid is heated at about 75° C. under a stream of nitrogen for about 3 minutes. The heat is removed and the mixture stirred for a period of about 30 minutes and then poured with vigorous stirring into about 50 ml. of water. The solid that precipitates is separated by filtration, dried and recrystallized from ethyl acetate to give pure 9α-fluoro-B-nor-6β-methyl - 11β,17α-dihydroxy-1,4-pregnadiene-3,20 - dione 17-acetate (IXa).

Substituting another lower-hydrocarbon carboxylic acid anhydride for the acetic anhydride is productive of other 9α-fluoro-B-nor-6β - methyl - 11β,17α - dihydroxy-1,4-pregnadiene-3,20-dione 17-acylates wherein the acyl radical of the acylate group is the acyl radical of, for example, a lower-aliphatic acid, e.g., formic (formic acid plus acetic anhydride), propionic, butyric, isobutyric, valeric, isovaleric, trimethylacetic, 2-methylbutyric, 3-ethylbutyric, hexanoic, diethylacetic, triethylacetic, heptanoic, octanoic, α-ethyl-isovaleric, a cyclic acid, e.g., cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., benzoic, methylbenzoic, dimethylbenzoic, ethylbenzoic, trimethylbenzoic, α-naphthoic, 3-methyl-α-naphthoic, an aralkyl acid, e.g. phenylacetic, phenylpropionic, diphenylacetic, triphenylacetic, a dibasic acid (which can be converted to water soluble, e.g., sodium salts) e.g., succinic, glutaric, α-methylglutaric, β-methylglutaric, β,β-dimethylglutaric, adipic, pimelic, and suberic acid.

Following the procedure of Example 39, but substituting as starting materials for 9α-fluoro-B-nor-6β-methyl-11β,17α-dihydroxy-1,4-pregnadiene - 3,20 - dione (XIXa) the other compounds embraced by Formulae IX (wherein R and Y are H and Z is other than the β-hydroxymethylene radical), XIVa, XIXa and XXa of the flow-sheet in columns 5, 7 and 8, yields the corresponding compounds of Formula IXa of the flow-sheet in column 7.

EXAMPLE 40

*9α-fluoro-B-nor-6(α and β)-methyl-11β,17α-dihydroxy-1,4-pregnadiene-3,20-dione 17-acetate (IXb)*

A solution is prepared containing 0.1 g. of 9α-fluoro-B-nor - 6β - methyl - 11β,17α - dihydroxy - 1,4 - pregnadiene - 3,20 - dione 17 - acetate (IXa) (prepared in the manner disclosed in Example 39) in 3.5 ml. of chloroform (stabilized with ethanol). To this solution at 0° C., dry hydrogen chloride gas is passed in during a period of about 5 minutes. The chloroform solution is then neutralized, by washing, with 2.5 ml. of aqueous 5% sodium bicarbonate solution and the chloroform solution concentrated on a water bath at a temperature of about 50° C. to dryness. The residue is redissolved in methylene chloride and chromatographed over a 15 g. column of Florisil. The products are eluted with thirty fractions of 25 ml. each over a gradient of 2 to 20% acetone in Skellysolve B. Approximately half of the fractions eluted contained mainly 9α - fluoro - B - nor - 6β - methyl - 11β,17α - dihydroxy - 1,4 - pregnadiene - 3,20 - dione 17 - acetate (IXb), while the remainder yielded the corresponding 6α-epimer (IXb).

Following the procedure of Example 40, but substituting as starting materials for 9α - fluoro - B - nor - 6β - methyl - 11β,17α - dihydroxy - 1,4 - pregnadiene - 3,20-dione 17 - acetate (IXa) the other compounds embraced by Formula IXa of the flow-sheet in column 7, yields the corresponding compounds of Formula IXb thereof.

EXAMPLE 41

*9α - fluoro - B - nor - 6α - methyl - 11β,17α - dihydroxy-1,4-pregnadiene-3,20-dione 17-acetate (IXc)*

(a) A solution is prepared containing 0.1 g. of 9α-fluoro - B - nor - 6β - methyl - 11β,17α - dihydroxy - 1,4 - pregnadiene - 3,20 - dione 17 - acetate (IXa) in 3.5 ml. of methanol. To this solution is added 0.5 ml. of 2 N aqueous sulfuric acid solution at room temperature and the reaction mixture allowed to stand for about 18 hours; it is then neutralized with 2.5 ml. of aqueous 5% sodium bicarbonate solution and concentrated on a water bath at a temperature of about 50° C. to a volume of about 2 ml. The mixture is then filtered and the recovered precipitate washed with 2.5 ml. of water, dried in a vacuum oven at about 65° C. to yield a light colored solid residue. The aqueous solution is extracted with three 2 ml. portions of ethyl acetate, the extracts combined, washed with three 2 ml. portions of water, dried over anhydrous sodium sulfate and evaporated under reduced pressure at about 55° C. to give a residue. The residues are combined and recrystallized from ethyl acetate to give pure, light colored, crystalline 9α fluoro - B - nor - 6α - methyl - 11β,17α - dihydroxy - 1,4 - pregnadiene - 3,20 - dione 17 - acetate (IXc).

(b) Instead of a mineral acid such as sulfuric, hydrochloric, dilute nitric, perchloric or the like, a base, preferably an alkali metal hydroxide such as sodium or potassium hydroxide or carbonate, or other acidic or basic enolyzing agents capable of temporarily enolyzing the 3-keto group to a 3-enol group can be used to epimerize the 6β-methyl compound (IXa) to the corresponding 6α-methyl steroid (IXc). The conversion with a base can be carried out as follows:

To 0.1 g. of 9α - fluoro - B - nor - 6β - methyl - 11β, 17α - dihydroxy - 1,4 - pregnadiene - 3,20 - dione 17 - acetate (IXa) dissolved in 5 ml. of methanol, 50 mg. of sodium hydroxide dissolved in 0.3 ml. of water is added and the mixture allowed to remain at room temperature for about 16 hours. The reaction mixture is diluted with 20 ml. of water, neutralized with 5 aqueous hydrochloric acid and extracted with three 7.5 ml. portions of methylene chloride. The methylene chloride extracts are washed with water several times, dried over anhydrous sodium sulfate, evaporated and the thus obtained residue recrystallized from acetone to give pure, light colored, crystalline 9α-fluoro - B - nor - 6α - methyl - 11β,17α - dihydroxy - 1,4 - pregnadiene - 3,20 - dione 17 - acetate (IXc).

Following the procedure of Example 41, but substituting as starting materials for 9α - fluoro - B - nor - 6β - methyl - 11β,17α - dihydroxy - 1,4 - pregnadiene - 3,20 - dione 17 - acetate (IXa) the other compounds embraced by Formula IXa of the flow-sheet in column 7, yields the corresponding compounds of Formula IXc thereof.

EXAMPLE 42

*9α - fluoro - B - nor - 6α - methyl - 11β,17α - dihydroxy - 1,4 - pregnadiene - 3,20 - dione 17 - acetate (IXc)*

Following the procedure of Example 41(a) and (b), but substituting as starting materials for 9α - fluoro - B - nor - 6β - methyl - 11β,17α - dihydroxy - 1,4 - pregnadiene - 3,20 - dione 17 - acetate (IXa) the corresponding 6(α and β)-methyl compounds (IXb) also yields 9α-fluoro - B - nor - 6α - methyl - 11β,17α - dihydroxy - 1,4-pregnadiene - 3,20 - dione 17 acetate (IXc).

EXAMPLE 43

*6(α and β)-methyl compounds comprising Formula XXI of the flow-sheet in column 8*

Following the procedure of Example 40, but substituting as starting materials for 9α - fluoro - B - nor - 6β - methyl - 11β,17α - dihydroxy - 1,4 - pregnadiene - 3,20 - dione 17 - acetate (IXa) the compounds embraced by Formulae IX, XIII, XIII', XIV, XIV', XV, XIX, XIX', XX, XIVa, XIXa and XXa of the flow-sheet, above, yields the compounds embraced by Formula XXI of the flow-sheet in column 8.

EXAMPLE 44

*6α-methyl compounds comprising Formula XXI' of the flow-sheet in column 8*

Following the procedures of Examples 44(a) and (b), but substituting as starting materials for 9α - fluoro - B - nor - 6β - methyl - 11β,17α - dihydroxy - 1,4 - pregnadiene - 20 - dione 17 - acetate (IXa) the compounds embraced by Formulae IX, XIII, XIII', XIV, XIV', XV, XIX, XIX', XX, XIVa, XIXa and XXa of the flow-sheet, above, yields the compounds embraced by Formula XXI' of the flow-sheet in column 8.

EXAMPLE 45

*6α-methyl compounds comprising Formula XXI'*

Following the procedures of Examples 41(a) and (b), but substituting as starting materials for 9α - fluoro - B - nor - 6β - methyl - 11β,17α - dihydroxy - 1,4 - pregnadiene - 3,20 - dione 17 - acetate (IXa) the 6(α and β)-methyl compounds embraced by Formula XXI of the flow-sheet in column 8, yields the corresponding compounds embraced by Formula XXI' thereof.

I claim:
1. B-nor compounds of the formula

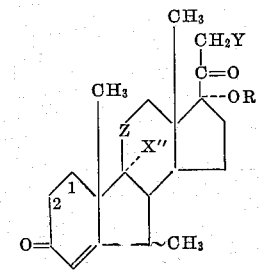

wherein the 1,2-carbon linkage is selected from the group consisting of single bonds and double bonds; ~ is a generic expression denoting α- and β-bonds and mixtures thereon; X is selected from the group consisting of hydrogen and fluorine; when X is hydrogen, Z is selected from the group consisting of the methylene radical ($>CH_2$), and α-hydroxymethylene radical

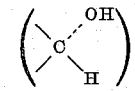

the β-hydroxymethylene radical

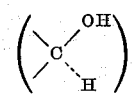

and the carbonyl radical ($>C=O$); when X is fluorine, Z is selected from the group consisting of the α-hydroxymethylene radical, the β-hydroxymethylene radical and the carbonyl radical; Y is selected from the group consisting of hydrogen, hydroxy and the lower-acyloxy radical of a hydrocarbon carboxylic acid containing from one to twelve carbon atoms, inclusive; when Y is hydrogen and Z is selected from the group consisting of β-hydroxymethylene and methylene, R is selected from the group consisting of hydrogen and the lower-acyl radical of a hydrocarbon carboxylic acid containing from one to twelve carbon atoms, inclusive; when Y is selected from the group consisting of hydroxy and the lower-acyloxy radical of a hydrocarbon carboxylic acid containing from one to twelve carbon atoms, inclusive, and Z is selected from the group consisting of α-hydroxymethylene and the lower-acyloxy radical of a hydrocarbon carboxylic acid containing from one to twelve carbons atoms, inclusive, R is hydrogen.

2. A compound selected from the group consisting of B - nor - 6β - methyl - 17α - hydroxy - 4 - pregnene-3,20-dione and the 17-acylates thereof wherein the acyl radical is that of a hydrocarbon carboxylic acid containing from one to twelve carbon atoms, inclusive; the corresponding 1-dehydro analogues of the foregoing.

3. A compound selected from the group consisting of B - nor - 6β - methyl - 11β,17α - dihydroxy - 4 - pregnene-3,20-dione and the 17-acylates thereof wherein the acyl radical is that of a hydrocarbon carboxylic acid containing from one to twelve carbon atoms, inclusive; the corresponding 11α-hydroxy isomers and 1-dehydro analogues of the foregoing.

4. A compound selected from the group consisting of B - nor - 6β - methyl - 11β,17α - dihydroxy - 9α - fluoro-4-pregnene-3,20-dione and the 17-acylates thereof wherein the acyl radical is that of a hydrocarbon carboxylic acid containing from one to twelve carbon atoms, inclusive; the corresponding 1-dehydro analogues of the foregoing.

5. A compound selected from the group consisting of B - nor - 6β - methyl - 17α,21 - dihydroxy - 9α - fluoro-4-pregnene-3,11,20-trione and the 21-acylates thereof wherein the acyl radical is that of a hydrocarbon carboxylic acid containing from one to twelve carbon atoms, inclusive; the corresponding 1-dehydro analogues of the foregoing.

6. A compound selected from the group consisting of B - nor - 6β - methyl - 11β,17α,21 - trihydroxy - 4 - pregnene-3,20-dione and the 21-acylates thereof wherein the acyl radical is that of a hydrocarbon carboxylic acid containing from one to twelve carbon atoms, inclusive; the corresponding 11α-hydroxy isomers and 1-dehydro analogues of the foregoing.

7. A compound selected from the group consisting of B - nor - 6β - methyl - 11β,17α,21 - trihydroxy - 9α-fluoro-4-pregnene-3,20-dione and the 21-acylates thereof wherein the acyl radical is that of a hydrocarbon carboxylic acid containing from one to twelve carbon atoms, inclusive; the corresponding 1-dehydro analogues of the foregoing.

8. A compound selected from the group consisting of B - nor - 6α - methyl - 17α - hydroxy - 4 - pregnene-3,20-dione and the 17-acylates thereof wherein the acyl radical is that of a hydrocarbon carboxylic acid containing from one to twelve carbon atoms, inclusive; the corresponding 1-dehydro analogues of the foregoing.

9. A compound selected from the group consisting of B - nor - 6α - methyl - 11β,17α - dihydroxy - 9α - fluoro-4-pregnene-3,20-dione and the 17-acylates thereof wherein the acyl radical is that of a hydrocarbon carboxylic acid containing from one to twelve carbon atoms, inclusive; the corresponding 1-dehydro analogues of the foregoing.

10. A compound selected from the group consisting of B - nor - 6α - methyl - 17α,21 - dihydroxy - 4 - pregnene-3,20-dione and the 21-acylates thereof wherein the acyl radical is that of a hydrocarbon carboxylic acid containing from one to twelve carbon atoms, inclusive; the corresponding 1-dehydro analogues of the foregoing.

11. A compound selected from the group consisting of B - nor - 6α - methyl - 11β,17α,21 - trihydroxy - 4-pregnene-3,20-dione, the 21-acylates thereof wherein the acyl radical is that of a hydrocarbon carboxylic acid containing from one to twelve carbon atoms, inclusive; the corresponding 11α-hydroxy isomers and 1-dehydro analogues of the foregoing.

12. A compound selected from the group consisting of B - nor - 6α - methyl - 11β,17α,21 - trihydroxy - 9α-fluoro-4-pregnene-3,20-dione and the 21-acylates thereof wherein the acyl radical is that of a hydrocarbon carboxylic acid containing from one to twelve carbon atoms, inclusive; the corresponding 1-dehydro analogues of the foregoing.

13. A compound selected from the group consisting of B-nor-6α-methyl-17α,21-dihydroxy-9α-fluoro-4 - pregnene-3,11,20-trione and the 21-acylates thereof wherein the acyl radical is that of a hydrocarbon carboxylic acid containing from one to twelve carbon atoms, inclusive; the corresponding 1-dehydro analogues of the foregoing.

14. A process for the production of a compound of the Formula (IX')

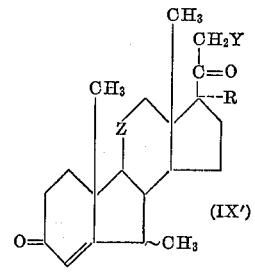

wherein Y is selected from the group consisting of hydrogen, hydroxy and the lower-acyloxy radical of an organic carboxylic acid containing from one to twelve carbon atoms, inclusive; when Y is hydrogen and Z is selected from the group consisting of β-hydroxymethylene and methylene, R is selected from the group consisting of hydrogen, hydroxy and the lower-acyloxy radical of an organic carboxylic acid containing from one to twelve carbon atoms, inclusive; when Y is selected from the group consisting of hydroxy and lower-acyloxy and Z is selected from the group consisting of the methylene radical (>CH$_2$), the β-hydroxymethylene radical

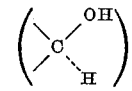

the α-hydroxymethylene radical

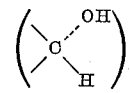

and the α-acyloxymethylene radical

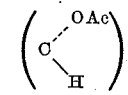

wherein Ac is the acyl radical of an organic carboxylic acid containing from one to twelve carbon atoms, inclusive, R is selected from the group consisting of hydrogen and hydroxy, which comprises the steps of (1) subjecting a compound of the Formula (A)

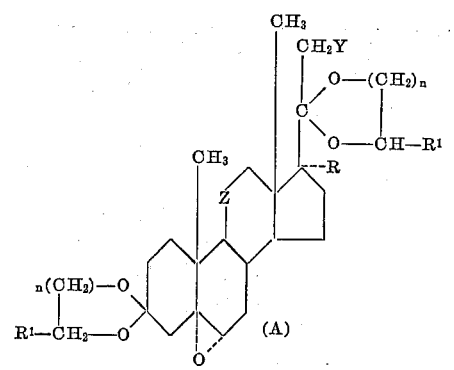

wherein R, Y and Z have the same meanings as above; $n$ is selected from the integers one and two; R$^1$ is selected from the group consisting of hydrogen and a lower-alkyl radical containing from one to six carbon atoms, inclusive, to 6β-azidylation to yield a compound of the Formula (I)

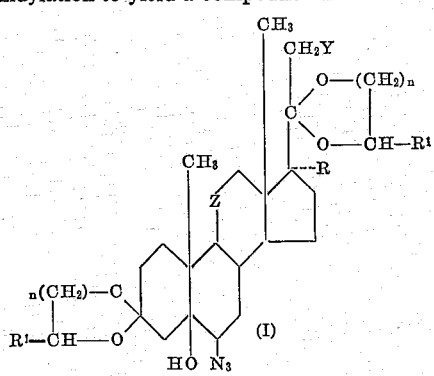

wherein R, R¹, Y, Z and $n$ have the same meanings as above; (2) subjecting a thus-produced compound of Formula (I) to irradiation with ultraviolet light to obtain a compound of the Formula (II)

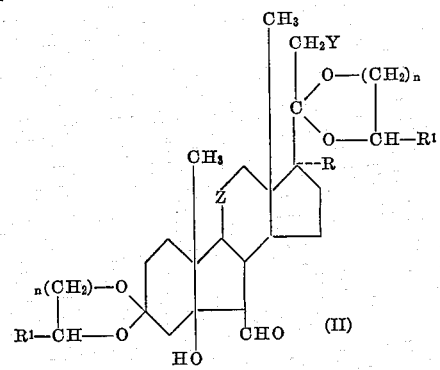

wherein R, R¹, Y, Z and $n$ have the same meanings as above; (3) reducing a thus-produced compound of Formula (II) to yield a compound of the Formula (V)

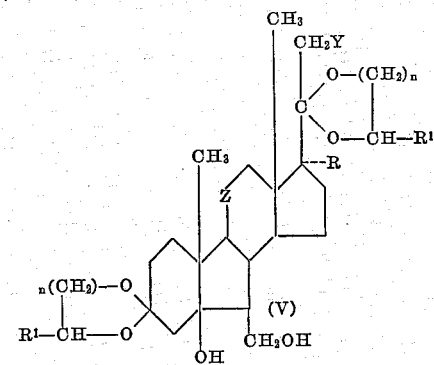

wherein R, R¹, Y and Z have the same meanings as above; (4) subjecting a thus-produced compound of Formula (V) to treatment with an organic sulfonyl halide to yield a compound of Formula (VI)

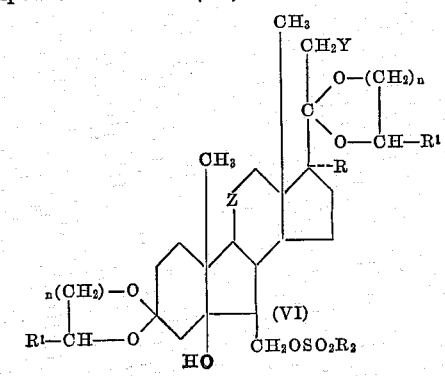

wherein R, R¹, Y and Z have the same meanings as above, and R² is an organic radical selected from the group consisting of alkyl and aryl and containing from one to ten carbon atoms, inclusive; (5) treating a thus-produced compound of Formula (VI) with lithium aluminum hydride to give a compound of the Formula (VII)

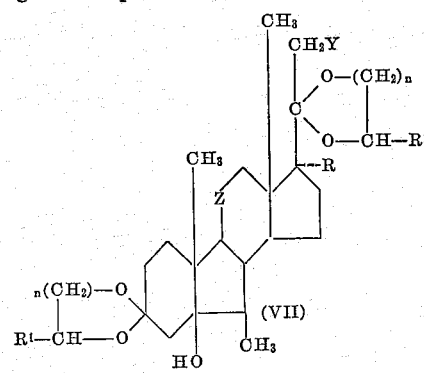

wherein R, R¹, Y and Z have the same meanings as above; (6) hydrolyzing the 3- and 20- ketal groups of a thus-produced compound of Formula (VII) to obtain a compound of the Formula (VIII)

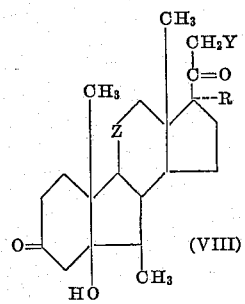

wherein R, Y and Z have the same meanings as above; (7) dehydrating a thus-produced compound of Formula (VII) to yield a compound of Formula (IX)

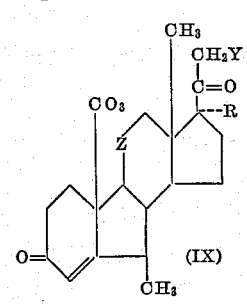

wherein R, Y and Z have the same meanings as above, and (8) isomerizing a thus-produced compound of Formula (IX) to obtain a compound of Formula (IX'), above.

15. A process for the production of a compound of Formula (IX')

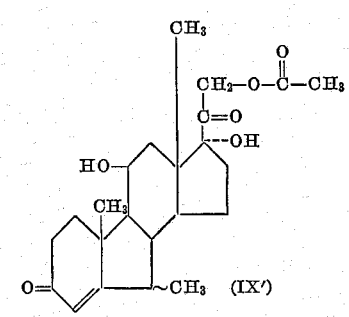

which comprises: (1) treating the compound of the Formula (A)

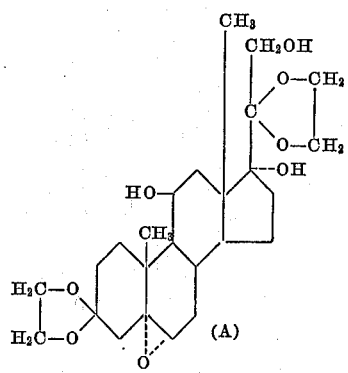

with sodium azide to yield the compound of Formula (I)

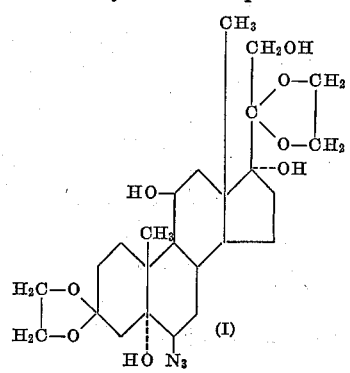

(1a) treating the thus-produced compound of Formula (I) in pyridine with acetic anhydride to obtain the compound of Formula (Ia)

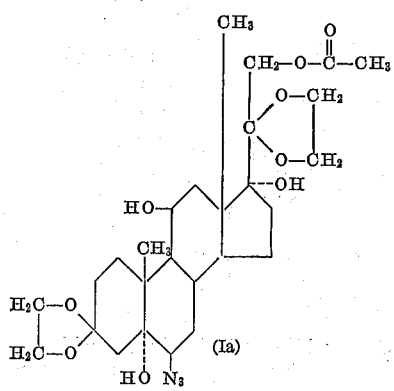

(2) irradiating the thus-produced compound of Formula (Ia) with ultraviolet light to obtain the compound of Formula (II)

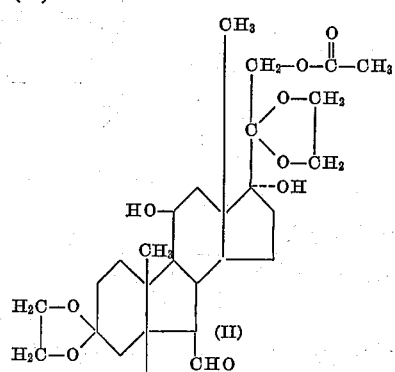

(3) treating the compound of Formula (II) with sodium borohydride to yield the compound of Formula (V)

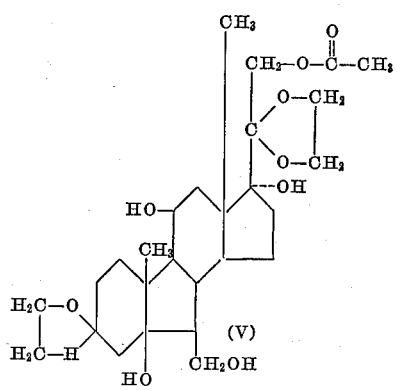

(4) treating the compound of Formula (V) with p-toluenesulfonyl chloride to give the compound of Formula (VI)

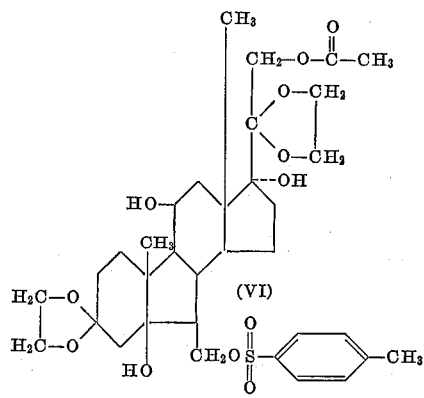

(5) treating the thus-produced compound of Formula (VI) with lithium aluminum hydride to give the compound of Formula (VII)

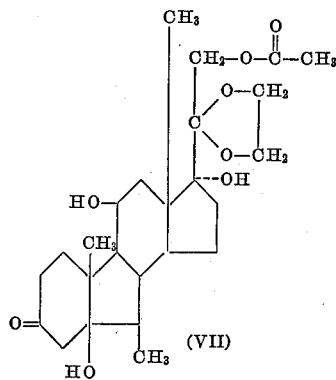

(6) treating the thus-produced compound of Formula (VII) with acetic acid to obtain the compound of Formula (VIII)

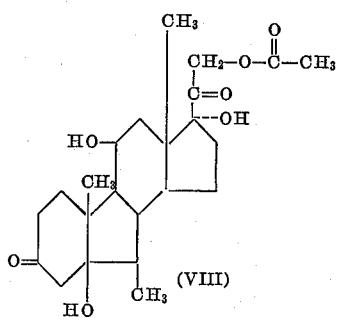

(7) treating the thus-produced compound of Formula (VIII) in pyridine with sulfuryl chloride to give the compound of Formula (IX)

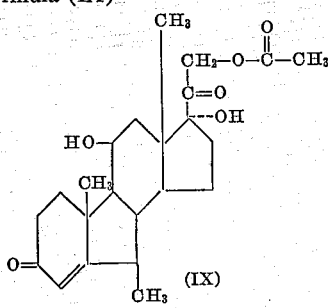

and (8) treating the thus-produced compound of Formula (IX) in chloroform with dry hydrochloric acid to obtain a compound of Formula (IX'), above.

16. A process for the production of a compound of the Formula (IX')

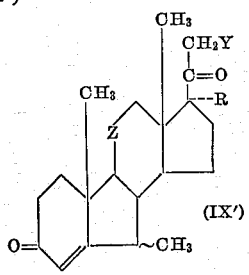

wherein Y is selected from the group consisting of hydrogen, hydroxy and the lower-acyloxy radical of an organic carboxylic acid containing from one to twelve carbon atoms, inclusive; when Y is hydrogen and Z is selected from the group consisting of β-hydroxymethylene and methylene, R is selected from the group consisting of hydrogen, hydroxy and the lower-acyloxy radical of an organic carboxylic radical containing from one to twelve carbon atoms, inclusive; when Y is selected from the group consisting of hydroxy and lower-acyloxy, Z is selected from the group consisting of the methylene radical (>CH$_2$), the β-hydroxymethylene radical

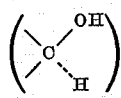

the α-hydroxymethylene radical

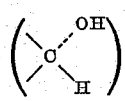

and the α-acyloxymethylene radical

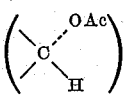

wherein Ac is the acyl radical of an organic carboxylic acid containing from one to twelve carbon atoms, inclusive, R is selected from the group consisting of hydrogen and hydroxy, which comprises the steps of: (1) dehydrating a compound of the Formula (VIII)

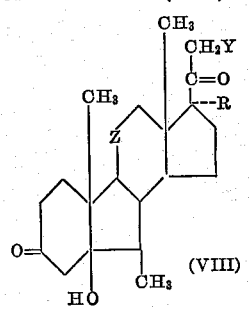

wherein R, Y and Z have the same meanings as above, to yield a compound of the Formula (IX)

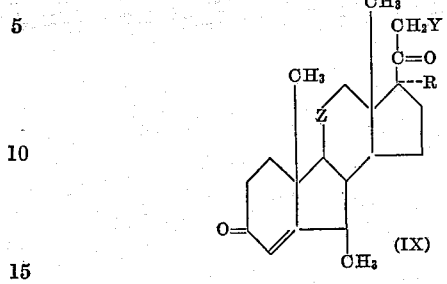

wherein R, Y and Z have the same meanings as above, and (2) isomerizing a thus-produced compound of Formula (IX) to obtain a compound of Formula (IX'), above.

17. A process for the production of a compound of the Formula (IX')

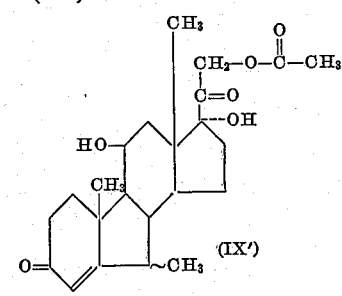

which comprises treating a compound of the Formula (IX)

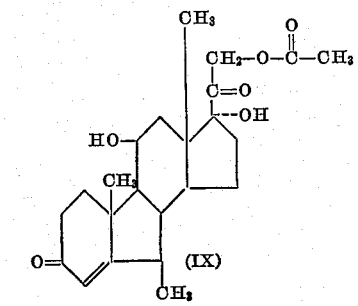

in chloroform with dry hydrochloric acid.

18. A process for the production of a compound of the Formula (II)

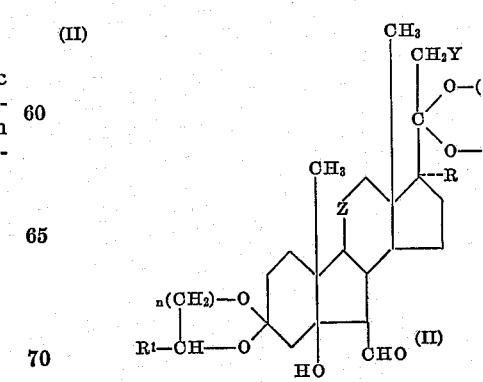

wherein Y is selected from the group consisting of hydrogen, hydroxy and the lower-acyloxy radical of an organic carboxylic acid containing from one to twelve carbon atoms, inclusive; when Y is hydrogen and Z is selected from the group consisting of β-hydroxymethylene and methylene, R is selected from the group consisting of hydrogen, hydroxy and the lower-acyloxy radical of an organic carboxylic acid containing from one to twelve carbon atoms, inclusive; when Y is selected from the group consisting of hydroxy and lower-acyloxy and Z is selected from the group consisting of the methylene radical (>CH₂), the β-hydroxymethylene radical

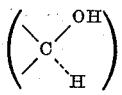

the α-hydroxymethylene radical

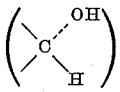

and the α-acyloxymethylene radical

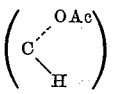

wherein Ac is the acyl radical of an organic carboxylic acid containing from one to twelve carbon atoms, inclusive, R is selected from the group consisting of hydrogen and hydroxy; R¹ is selected from the group consisting of hydrogen and a lower-alkyl radical containing from one to six carbon atoms, inclusive; n is selected from the integers one and two, which comprises the steps of (1) subjecting a compound of the Formula (A)

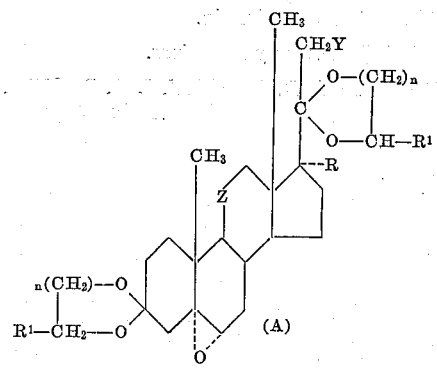

wherein R, R¹, n, Y and Z have the same meanings as above, to treatment with an alkali metal azide to yield a compound of the Formula (I)

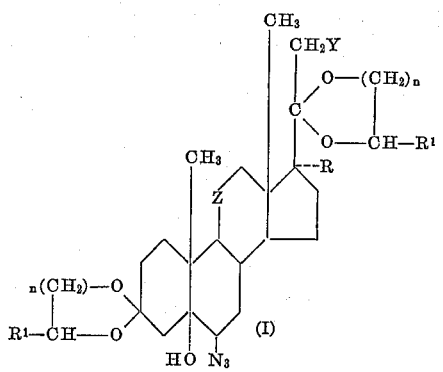

wherein R, R¹, Y, Z and n have the same meanings as above and (2) subjecting a thus-produced compound of Formula (I) to irradiation with ultraviolet light to obtain a compound of the Formula (II), above.

19. A process for the production of a compound of the Formula (I)

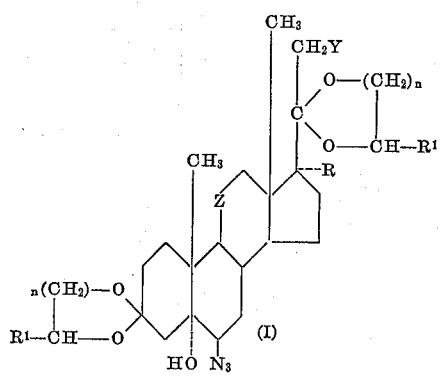

wherein Y is selected from the group consisting of hydrogen, hydroxy and the lower-acyloxy radical of an organic carboxylic acid containing from one to twelve carbon atoms, inclusive; when Y is hydrogen and Z is selected from the group consisting of β-hydroxymethylene and methylene, R is selected from the group consisting of hydrogen, hydroxy and the lower-acyloxy radical of an organic carboxylic acid containing from one to twelve carbon atoms, inclusive; when Y is selected from the group consisting of hydroxy and lower-acyloxy and Z is selected from the group consisting of the methylene radical (>CH₂), the β-hydroxymethylene radical

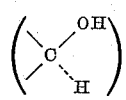

the α-hydroxymethylene radical

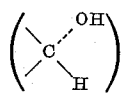

and the α-acyloxymethylene radical

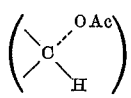

wherein Ac is the acyl radical of an organic carboxylic acid containing from one to twelve carbon atoms, inclusive; R is selected from the group consisting of hydrogen and hydroxy; R¹ is selected from the group consisting of hydrogen and a lower-alkyl radical containing from one to six carbon atoms, inclusive; n is selected from the integers one and two, which comprises subjecting a compound of the Formula (A)

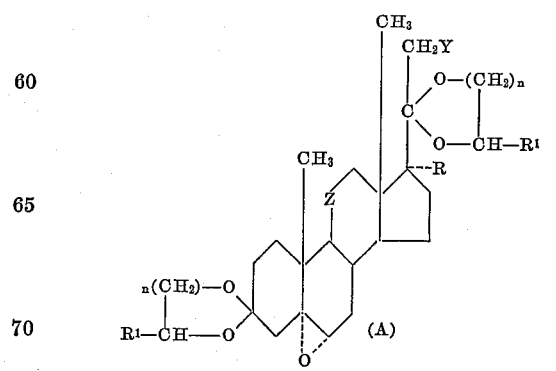

wherein R, R¹, n, Y and Z have the same meanings as above, to treatment with an alkali metal azide to yield a compound of the Formula (I), above.

20. A process for the production of a compound of the Formula (II)

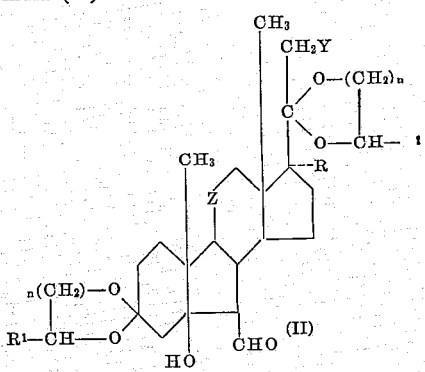

wherein Y is selected from the group consisting of hydrogen, hydroxy and the lower-acyloxy radical of an organic carboxylic acid containing from one to twelve carbon atoms, inclusive; when Y is hydrogen and Z is selected from the group consisting of β-hydroxymethylene and methylene, R is selected from the group consisting of hydrogen, hydroxy and the lower-acyloxy radical of an organic carboxylic acid containing from one to twelve carbon atoms, inclusive; when Y is selected from the group consisting of hydroxy and lower-acyloxy and Z is selected from the group consisting of the methylene radical (>CH$_2$), the β-hydroxymethylene radical

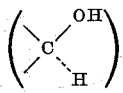

the α-hydroxymethylene radical

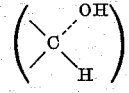

and the α-acyloxymethylene radical

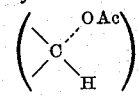

wherein Ac is the acyl radical of an organic carboxylic acid containing from one to twelve carbon atoms, inclusive, R is selected from the group consisting of hydrogen and hydroxy; R$^1$ is selected from the group consisting of hydrogen and a lower-alkyl radical containing from one to six carbon atoms, inclusive; $n$ is selected from the integers one and two, which comprises subjecting a compound of Formula (I)

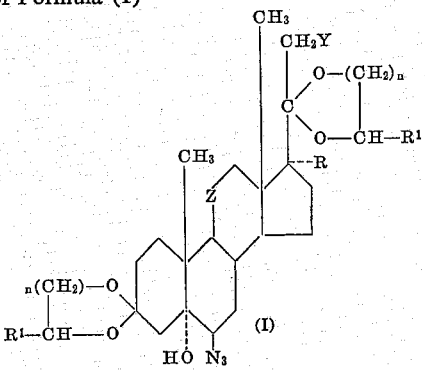

wherein R, R$^1$, $n$, Y and Z have the same meanings as above, to irradiation with ultraviolet light to obtain a compound of the Formula (II), above.

21. 5α-hydroxy-6β-azidopregnane-3,20-dione, 3,20-bis-ethylene-ketal.

References Cited

UNITED STATES PATENTS 3,072,681  1/1963  Kerwin.

LEWIS GOTTS, *Primary Examiner.*

E. L. ROBERTS, J. R. GENTRY, J. R. BROWN,
*Assistant Examiners.*

CERTIFICATE OF CORRECTION

Patent No. 3,338,891                                       August 29, 1967

William J. Wechter

It is hereby certified that error appears in the above numbered patent requiring correction and that the said Letters Patent should read as corrected below.

Column 11, line 34, for "and X" read -- and Z --; column 12, line 7, for "7α" read -- 17α --; column 13, line 65, for "dihydroxyl" read -- dihydroxy --; column 20, line 4, for "11β" read -- 11α --; line 55, for "actetate" read -- acetate --; column 23, line 27, for "(XIII)" read -- (XIII′) --; line 32, for "Sir" read -- Six --; line 56, for "friction" read -- fraction --; line 75, for "(XIVA)" read -- (XIVa) --; column 27, lines 16 and 24, for "(XVII)", each occurrence, read -- (XVIII) --; column 31, line 74, for "Examples 44" read -- Example 41 --; column 32, line 2, for "20-dione" read -- 3,20-dione --; lines 20 to 31, for that portion of the formula reading " ⟋X″ " read -- ⟋X --; same column 32, line 36, for "thereon" read -- thereof --; column 35, lines 3 to 17, the formula should appear as shown below instead of as in the patent:

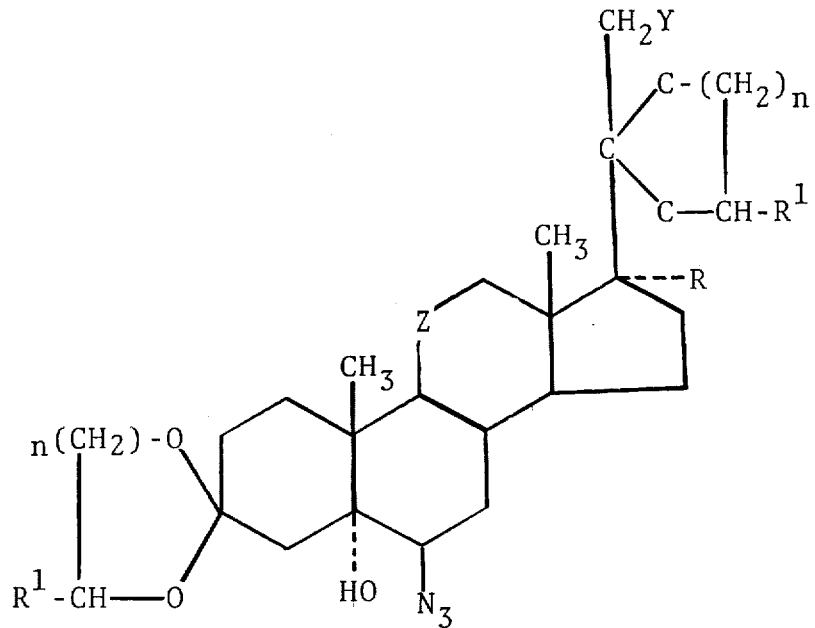

column 36, lines 45 to 56, for that portion of the formula reading "$\overset{|}{C}O_3$" read -- $\overset{|}{C}H_3$ --; column 38, lines 3 to 18, for that portion of the formula reading "$H_2\overset{|}{\underset{\diagdown}{C}}-H$" read -- $H_2\overset{|}{\underset{\diagdown}{C}}-O$ -- column 43, lines 3 to 18, for that portion of the formula reading "$\underset{\diagdown}{O}-\overset{|}{C}H-^1$" read -- $\underset{\diagdown}{O}-\overset{|}{C}H-R^1$ --.

Signed and sealed this 28th day of January 1969.

(SEAL)
Attest:

EDWARD M. FLETCHER, JR.
Attesting Officer

EDWARD J. BRENNER
Commissioner of Patents